Sept. 21, 1954 J. E. STORER, JR., ET AL 2,689,489
STEERING CONTROL SYSTEM FOR VEHICLES
Filed Dec. 13, 1950 4 Sheets-Sheet 3

Inventors
John E. Storer, Jr.
William G. Livezey &
Elmer A. Richards
By Willits, Helwig & Baillio
Attorneys Sept. 21, 1954   J. E. STORER, JR., ET AL   2,689,489
STEERING CONTROL SYSTEM FOR VEHICLES
Filed Dec. 13, 1950   4 Sheets-Sheet 4

Inventors
John E. Storer, Jr.
William G. Livezey &
Elmer A. Richards
By Willits, Helwig & Bailie
Attorneys Patented Sept. 21, 1954

2,689,489

UNITED STATES PATENT OFFICE 2,689,489

STEERING CONTROL SYSTEM FOR VEHICLES

John E. Storer, Jr., William G. Livezey, and Elmer A. Richards, Indianapolis, Ind., assignors to General Motors Corporation, Detroit, Mich., a corporation of Delaware Application December 13, 1950, Serial No. 200,625

14 Claims. (Cl. 74—710.5)

Our invention relates to transmissions for self-propelled vehicles and more particularly to improved means for controlling the steering clutches employed in transmissions for track laying vehicles which are steered by varying the rates at which the tracks on opposite sides of the vehicle are driven.

In application Serial No. 178,912 of John E. Storer, Jr., and William G. Livezey, filed August 11, 1950, for Improved Steering Drive for Vehicle Transmission, there is shown a cross drive transmission of a type adapted for use in track laying vehicles such as tanks. In the transmission shown in that application, there are output shafts on opposite sides of the vehicle. These output shafts drive the vehicle tracks and are driven from a main drive shaft through planetary gear sets. The reaction gears of these planetary gear sets are connected together through a reaction gear unit, while means is provided to drive elements of the reaction gear unit in one direction or the other and thereby drive the reaction gears of the planetary gear sets so as to relatively accelerate one output shaft and relatively retard the other output shaft and thus cause the vehicle to turn in one direction or the other. The elements of the reaction gear unit are driven from a steering shaft through a right and a left steer clutch which are hydraulically controlled and may be engaged in variable amounts to drive the reaction gears at varying rates and thus regulate the rate of turn of the vehicle. The steer clutches are required to transmit substantial amounts of torque, and, therefore, must be of substantial physical size with the result that the clutches are difficult to control, and it is difficult to regulate the degree of engagement of the clutches to steer the vehicle accurately and smoothly.

An object of this invention is to provide improved means for controlling the steer clutches employed in a transmission of the type described.

A further object of the invention is to provide improved clutch control means of the type described which is arranged to insure that the degree of effective engagement of the clutches may be accurately and gradually varied throughout a wide range to thereby enable the vehicle to be steered accurately and smoothly.

Another object of the invention is to provide improved clutch control means of the type described which incorporates means responsive to the rate of turn of the vehicle for regulating the degree of effective engagement of the steering clutches.

A further object of the invention is to provide improved clutch control means of the type described and in which the clutches for the two directions of turning of the vehicle are operated by a double acting piston subject to the opposing pressures of the fluid in two chambers, one for each direction of turning, and in which fluid is supplied to both chambers when the vehicle is being turned in either direction, the direction and rate of turning of the vehicle being determined by the relative pressures of the fluid in the two chambers.

Another object of the invention is to provide improved steering control means which operates automatically to limit the difference in the speed of the tracks on opposite sides of the vehicle.

A further object of the invention is to provide an improved transmission of the type described which incorporates means automatically operative on an unintended increase in the speed of one tread relative to the other tread to apply force to retard the tread, the speed of which has been relatively increased, and to apply torque to the tread, the speed of which has been relatively decreased.

Another object of the invention is to provide an improved steering control system which operates automatically to detect deviations in movement of the vehicle from the designated path and to promptly apply a corrective force which is proportional to the extent of the deviation.

Other objects of the invention and features of novelty will be apparent from the following description taken in connection with the accompanying drawings in which:

Figures 1a and 1b are enlarged fragmentary views showing the overrunning clutches in the means for driving the steering shaft.

In practicing our invention, we provide a double acting piston for controlling the engagement of the right and left steer clutches. This piston is responsive to the opposing pressures of the liquid in a right and a left clutch chamber and exerts force to apply the right steer clutch to a degree determined by the amount by which the pressure in the right steer clutch chamber exceeds the pressure in the left steer clutch member. Similarly, this piston exerts force to apply the left steer clutch to a degree determined by the amount by which the pressure in the left steer clutch chamber exceeds the pressure in the right steer clutch chamber.

This control system comprises a right and a left control passage or chamber, each of which has associated therewith a relay valve responsive to the pressure of the fluid therein for supplying fluid under pressure to and for releasing fluid under pressure from the corresponding clutch chamber. Manually controlled means is provided for at times supplying fluid under pressure to a selected control chamber and for at the same time releasing fluid from the other control chamber at adjustably variable rates.

In addition, there is provided fluid displacement means responsive to differences in the speed of the driving members on opposite sides of the vehicle for supplying to one or the other of the control chambers fluid which varies in volume in accordance with the degree of difference in the speed of the driving members. This fluid displacement means is arranged so that when a clutch is engaged and relatively accelerates one of the driving members, fluid is supplied to the control chamber associated with the other clutch. This results in a reduction in the degree of effective engagement of the first named clutch and causes the difference in the speed of the vehicle driving members to be equal to that required to operate the fluid displacement means to supply fluid at a rate equal to that at which fluid is manually released from the control passage associated with the second named clutch.

This arrangement also operates so that when the speed of one of the vehicle driving members is improperly increased, the fluid displacement means will supply fluid to the control chamber which will result in engagement of the steering clutch which will not only oppose the improper movement of such vehicle driving member, but will also cause the application of torque to the remaining driving member and thereby cause the vehicle to continue to be driven on the intended course.

The control system includes means effective when a steering movement is initiated to delay the increase of the pressure in the opposing clutch chamber and thus insure prompt engagement of the selected steering clutch. In addition, the control system includes means effective upon completion of a steering movement to promptly release the pressure from the chambers of both steering clutches and to also release the pressure of the fluid in the various control passages.

Figure 1:
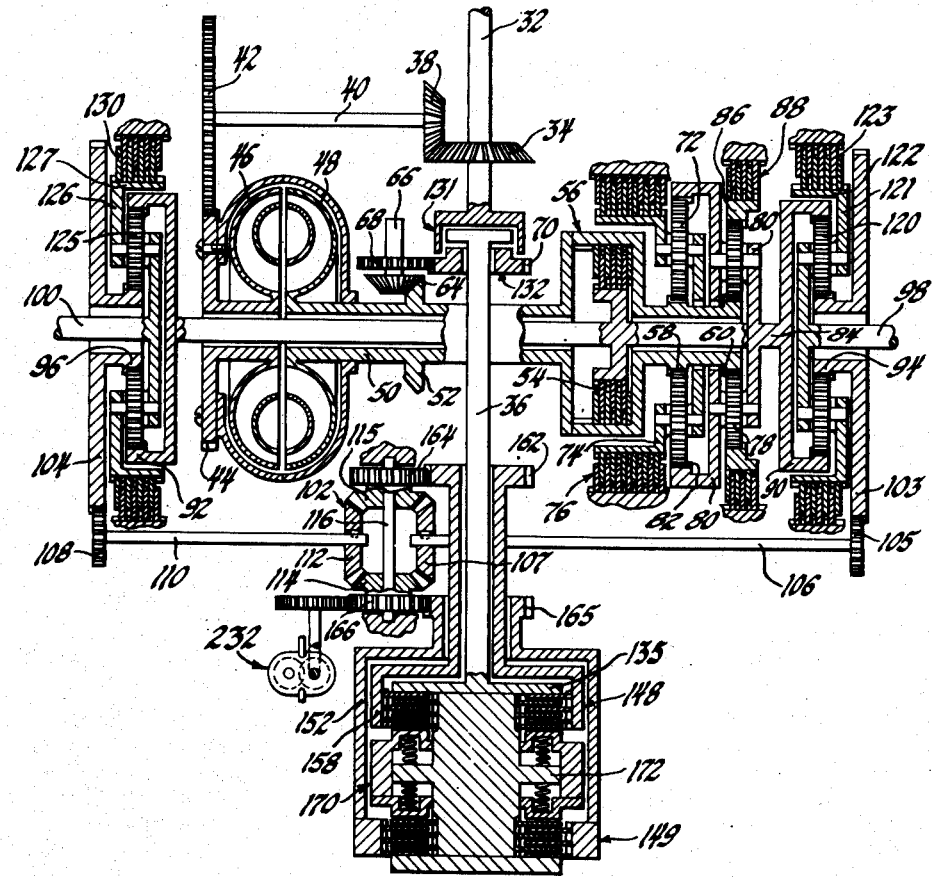
Figure 1 is a diagram of a vehicle transmission of the type with which this steering control system is adapted to be employed.

Referring to the drawings, Figure 1 is a diagram of a transmission of the type with which the control system provided by our invention is adapted to be employed. It is contemplated that the transmission shown in this figure of the drawings will be mounted in the rear of the vehicle and that the engine will be located in front of the transmission. Accordingly, the output shaft which extends from the left hand side of the transmission, as viewed in Figure 1 of the drawings, drives the left hand track of the vehicle, while the output shaft which extends from the right hand side of the transmission drives the right hand track of the vehicle. In addition, it is contemplated that the engine rotates in the usual direction, that is, in the clockwise direction as viewed from the front, and that the transmission input shaft is driven in the same direction as the engine.

The transmission input shaft 32 is assumed to be directly connected to the vehicle power plant, not shown, and has rigidly secured thereto a bevel gear 34. Force is transmitted from the shaft 32 through two different paths, one path being through the steering clutch driving shaft 36 and the other path being through the bevel gear 38 which is constantly in engagement with the gear 34. The gear 38, through its associated shaft 40, gear 42, and gear 44, drives the pump or impeller 46 of a conventional fluid torque transmitting device, the various gears being proportioned so that the torque transmitting device input element or impeller 46 is driven somewhat more rapidly than the engine shaft 32. The torque transmitting device turbine or driven member 48 drives a hollow shaft 50 carrying a bevel gear 52, one set of plates 54 of the high or direct drive clutch 56, and the sun gears 58 and 60. The bevel gear 52 meshes with a mating gear 64 which through a shaft 66 and spur gear 68 drives gear 70, and, as hereinafter explained, thereby drives a second input to the steering clutch driving shaft 36, the various gears being proportioned so that the gear 70 rotates somewhat more rapidly than the torque converter driven element 48. In addition, the various gears are arranged so that the gear 70 is rotated in the same direction as the engine driven shaft 32 and the associated gear 34.

The sun gear 58 drives planet gears 72 which are carried by a carrier 74 which may be anchored to the transmission housing by the reverse brake 76 to obtain reverse drive. The sun gear 60 drives planet gears 78 which are supported by carrier 80 which has rigidly attached thereto the ring gear 82 of the reverse planetary gear system, and which also has rigidly attached thereto the main driving shaft 84. The planet gears 78 also mesh with the low planetary gear system ring gear 86 which may be anchored to the housing of the transmission by a low speed brake device or brake 88 for low gear drive. The main driving shaft 84 drives the ring or orbit gears 90 and 92 which are one of the input gears of the planetary gear differential systems driving the right and left tracks, respectively, of the vehicle. The other input gears of these planetary gear systems are the sun gears 94 and 96, respectively, which are actuated through the steering mechanism, as hereinafter explained. Under normal operating conditions the two sun gears 94 and 96 react against each other so as to become reaction members, but under steering conditions one of the sun gears is rotated backwards while the other is rotated forwards, thus causing a differential in speed between the output shafts 98 and 100. The output shaft 98 has secured thereto a member, not shown, for driving the right hand track of the vehicle, and the output shaft 100 has secured thereto a similar member, not shown, for driving the left hand track of the vehicle.

The sun gears 94 and 96 are connected together through a reaction gear unit indicated generally by the reference numeral 102. The sun gear 94 is rigidly secured to a relatively large gear 103, and the sun gear 96 is rigidly secured to a similar relatively large gear 104. The gear 103 meshes with a gear 105 rigidly secured on one end of a shaft 106 which has rigidly secured on the other end thereof the bevel gear 107 of the reaction gear unit 102. Similarly, the gear 104 meshes with the gear 108 which is secured on one end of the shaft 110, on the other end of which is secured the bevel gear 112 associated with the reaction gear unit 102.

The bevel gears 107 and 112 mesh with bevel gears 114 and 115 of the reaction gear unit 102. The gears 114 and 115 are rotatably mounted on a shaft 116 which is supported in suitable manner from the housing of the transmission. The bevel gears 114 and 115 each have associated therewith a spur gear which is adapted to be driven from the steering clutch shaft 36 through the steering clutches, as hereinafter explained.

The sun gear 94, and the ring or orbit gear 90, both mesh with the planet gears 120 which are mounted on a carrier 121. The carrier 121 is rigidly secured to the output shaft 98, and is also rigidly secured to the drum 122 which carries one set of plates 123 of the service brakes. In like manner, the sun gear 96, and the ring or orbit gear 92, mesh with the planet gears 125 which are mounted on a carrier 126. The carrier 126 is rigidly secured to the output shaft 100, and is also rigidly secured to the drum 127 which carries one set of plates 130 of the service brakes.

As explained in detail in the above identified application of John E. Storer and William G. Livezey, the steering clutch drive shaft 36 is driven through a first overrunning clutch 131 from the engine driven shaft 32, and is driven through a second overrunning clutch 132 by the gear 70 which is driven from the fluid torque transmitting device output element 48. Hence, the steering clutch drive shaft 36 rotates whenever the engine operates, or whenever the vehicle is in motion, provided one of the devices 56, 76 or 88 is engaged.

When the engine driven shaft 32 is rotated, force is transmitted through the gears 34 and 38, the shaft 40 and the gears 42 and 44 to rotate the input element 46 of the fluid torque transmitting device. Accordingly, torque is transmitted through the fluid torque transmitting device to drive the output element 48 of the fluid torque transmitting device with the result that when one of the devices 56, 76, or 88 is engaged, force is transmitted from the hollow shaft 50 to the main drive shaft 84 to rotate the ring to orbit gears 90 and 92 associated therewith. When the ring or orbit gears 90 and 92 rotate they cause the planet gears 120 and 125 to rotate about the associated sun gears 94 and 96, respectively, with the result that the carrier 121 rotates the output shaft 98 and the carrier 126 rotates the output shaft 100. At the same time force is exerted on the sun gears 94 and 96 tending to rotate them in the direction opposite to that in which the gears 90 and 92 and the planet carriers 121 and 126 are rotated.

The force exerted on the sun gears 94 and 96 causes the associated gears 103 and 104 to exert force tending to rotate the gears 105 and 108, and the associated shafts 106 and 110, in the same direction that the main drive shaft 84 is rotated. Accordingly, shaft 106 exerts force through the gear 107, and the shaft 110 exerts force through the gear 112, upon the bevel gears 114 and 115 of the reaction gear unit 102. The forces exerted upon each of the bevel gears 114 and 115 by the gears 107 and 112 are opposite in direction so that all of the gears of the reaction gear unit 102, as well as the gears 105 and 103, and the sun gear 94, together with the gears 108 and 104 and the sun gear 96 remain stationary, and the sun gears 94 and 96 serve as reaction gears for the planetary systems in which they are incorporated.

The steering clutches provide means under the control of an operator for driving the bevel gears 114 and 115 of the reaction gear unit 102, and thereby driving the sun gears 94 and 96 to relatively accelerate one output shaft and to relatively retard the other output shaft.

Figure 2:
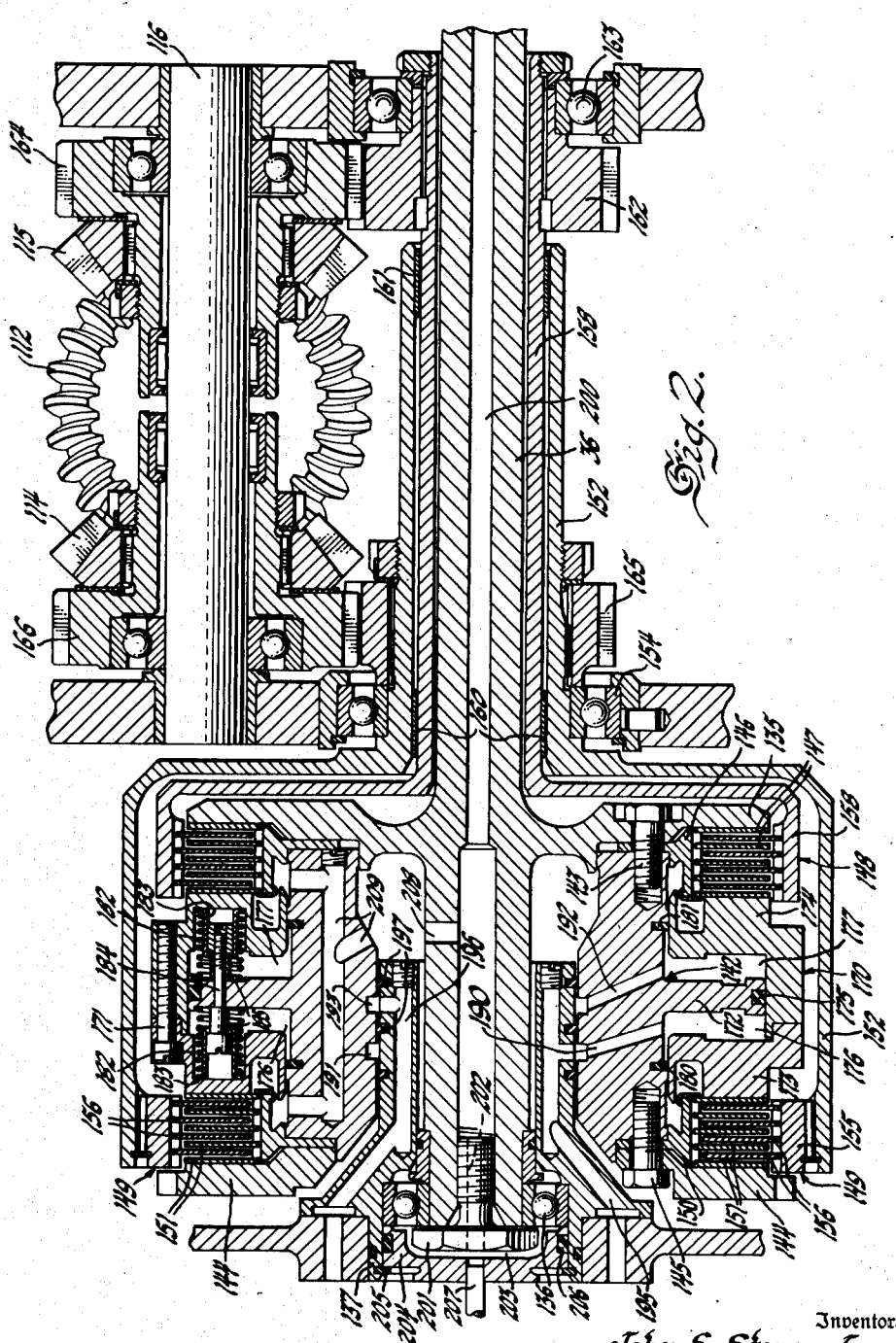
Figure 2 is a sectional view showing the construction of the steering clutches employed in the transmission shown in Figure 1.

Referring to Figure 2 of the drawings, it will be seen that the steering clutch shaft 36 has formed thereon a flange 135 of relatively large diameter, while the end of the shaft 36 remote from the engine is supported from the transmission housing by means of a ball bearing 136. The bearing 136 is mounted in a member 137 which is secured to the transmission housing by suitable means such as cap screws, not shown. The member 137 has a cylindrical extension which projects within the transmission housing and surrounds the end of the steering clutch driving shaft 36.

The shaft 36 has secured thereto the hub member 142 which surrounds the tubular extension on the member 137 and is secured to the flange 135 by means of a plurality of cap screws, one of which is indicated at 143. The hub member 142 has secured to the face thereof opposite the flange 135 a flange 144 which is of substantially the same diameter as the flange 135 and is secured to the hub member 142 by means of a plurality of cap screws, one of which is indicated at 145.

A ring 146 has an inwardly extending flange which is clamped between the hub member 142 and the flange 135, and has formed therein a plurality of holes through which the cap screws 143 extend. The radially outer face of the ring 146 is splined and this ring is adapted to receive the internally splined plates 147 of the right steer clutch 148.

A similar ring 150 has an inwardly extending flange which is clamped between the hub member 142 and the flange 144. The inwardly extending flange on the ring 150 has holes therein through which the cap screws 145 extend, while the radially outer face of the ring 150 is splined and is adapted to receive the driving plates 151 of the left steer clutch 149. This clutch includes the drum 152 which is of relatively large diameter and which has formed integral therewith a tubular extension of relatively small diameter which is supported from the transmission housing by means of a ball bearing 154. The drum 152 has adjacent its open end an inwardly extending flange 155. The flange 155 has formed on its radially inner face splines which are adapted to receive the driven plates 156 of the left steer clutch.

The steering clutch also includes a drum 158 which is of such diameter as to be received within the drum 152, and which has formed integral therewith a tubular extension of such size as to be received within the tubular extension on the drum 152 and to surround the steering clutch drive shaft 36. The tubular extensions on the drums 152 and 158 are supported relative to each other by means of bushings 160 and 161 mounted within the extension on the drum 152.

The tubular extension on the drum 158 has rigidly secured thereon a gear 162 which has a tubular extension which is supported from the transmission housing by means of a ball bearing 163. The gear 162 meshes with a spur gear 164 which is rigidly secured to the bevel gear 115 of the reaction gear unit 102.

The tubular extension on the drum 152 has rigidly secured thereto a gear 165 which meshes with a spur gear 166 which is rigidly secured to the bevel gear 114 of the reaction gear unit 102.

The steering clutch assembly includes a double acting piston or movable abutment indicated generally at 170 and constructed of two members which are secured together by a plurality of cap screws, one of which is indicated at 171. The piston 170 is in the form of a hollow cylindrical unit having therein a bore which is of such diameter as to closely surround the centrally located flange 172 on the hub member 142. The piston 170 has inwardly extending flanges 173 and 174 at the ends of the bore therein. The radially inner faces of the flanges 173 and 174 are of such diameter as to closely surround the main body of the hub member 142.

The flange 172 on the hub member 142 has in its outer face an annular groove in which there is mounted a packing ring 175 which engages the inner face of the bore in the piston 170 to prevent flow of liquid under pressure between the chambers 176 and 177 at opposite sides of the flange 172.

In addition, the main body of the hub member 142 has annular grooves therein in which there are mounted packing rings 180 and 181 which engage the inner faces of the flanges 173 and 174 on the piston 170 to prevent the escape of fluid under pressure from the chambers 176 and 177, respectively. As is clearly shown in the drawings, the inner faces of the flanges 173 and 174 are of such axial extent as to remain in engagement with the packing rings 180 and 181 during axial movement of the piston 170 relative to the hub 142.

The piston 170 is normally maintained in a substantially central position relative to the flange 172 on the hub member 142 by means of a plurality of coil springs 182 which are spaced apart circumferentially of the flange 172 on the hub member. Each of the springs 182 extends between a face of the flange 172 and the outwardly extending flange on a spring retainer 183 which is slidably mounted on a bolt 184 extending through the flange 172 on the hub member 142. Each bolt 184 has mounted thereon between its head and a face of the flange 172, a tubular spacer 185, and also has mounted thereon between a face of the flange 172 and the nut associated with the bolt, a similar spacer 185 so that the bolts are rigidly located relative to the flange 172 by the spacers. The flanges on the ends of the retainers 183 adjacent the flange 172 have bores therein of such diameter as to be slidable upon the spacers 185, but to engage the bolt head or the nut. Hence, the spring retainers 183 are movable towards the flange 172 when the associated coil springs 182 are compressed, while the spring retainers, by engagement with the bolt heads and the nuts, limit expansion of the coil springs 182. The coil springs and associated retainers 183 are received in bores in the inner faces of the flanges 173 and 174 of the piston 170, the spring retainers engaging the bottoms of these bores.

The coil springs 182 on opposite sides of the flange 172 exert force on the piston 170 tending to move the piston in opposite directions. The various parts of the equipment are arranged and proportioned so that when the piston 170 is located substantially centrally relative to the flange 172 on the hub member 142, at which time the piston is substantially in the position in which it is shown in Figure 2 of the drawings, the springs 182 on both sides of the flange 172 are expanded substantially the maximum amount permitted by the associated bolts and spring retainers. The equipment is also proportioned so that at this time the springs on opposite sides of the flange 172 exert relatively little force on the piston. On movement of the piston 170 in either direction from its central position, the springs 182 on one side of the flange 172 are compressed, while the springs 182 on the opposite of the flange 172 are restrained by the associated spring retainers. The springs which are compressed exert force effective to return the piston to its central position on release of the force moving the piston against the springs, while on return of the piston to its central position the further movement of the piston is prevented by engagement of the piston with the spring retainers associated with the coil springs on the opposite side of the flange 172, and is also prevented by the action of the spring retainers in limiting expansion of the springs which had been compressed. It will be seen, therefore, that the action of the coil springs 182 is to insure that the piston 170 will return to its central position and will normally be held in that position.

The flanges 173 and 174 on the piston 170 have on their axially outer faces relatively wide annular projections which are of such width and of such diameter as to be received between the rings 146 and 150 and the drums 155 and 158. The projections on the flanges 173 and 174 are adapted to engage the plates of the steering clutches and to press these plates against the flanges 135 and 144 associated with the driving shaft. The various parts of the equipment are arranged and proportioned so that when the piston 170 is in its central position, as shown in Figure 2 of the drawings, the projections on the flanges 173 and 174 of the piston 170 do not engage the clutch plates with the result that no force is exerted on the plates of either of the clutches and both clutches are disengaged.

The steering clutch assembly includes passages through which liquid under pressure may be supplied to and released from the chambers 176 and 177. As shown, the chamber 176 is connected by way of a passage 190 in the hub member 142 with an angular groove 191 on the inner face of the hub member 142. In like manner, the chamber 177 is connected by way of a passage 192 with the groove 193 on the inner face of the hub member 142.

The member 137 associated with the transmission housing has formed therein a passage 195 which communicates with the groove 191, while the member 137 also has formed therein a passage 196 which communicates with the groove 193. The outer face of the portion of the member 137 within the hub member 142 has therein a plurality of grooves in which there are mounted packing rings 197 which serve to prevent the escape of liquid under pressure from the grooves 191 and 193, and to prevent flow of liquid between these grooves.

The steering clutch assembly also includes passages through which lubricating and cooling liquid may be supplied to the clutches. As shown in Figure 2 of the drawings, the steering clutch driving shaft 36 is hollow and has a passage 200 in the center thereof. The ball bearing 136 on an end of the steering shaft is secured thereon by means of a cap screw 201 which has a substantially centrally located passage 202 extending therethrough. The chamber 203 surrounding the cap screw 201 is closed by a cover plate 204 which is held in place by means of a lock ring 205, while the joint between the plate 204 and the member 137 is sealed by a packing ring 206. The cover plate 204 has a substantially central opening therein to which is secured a pipe 207 leading from a source of lubricant under pressure, as hereinafter explained.

The shaft 36 has a passage 208 leading from the central passage 200 and communicating with the area within hub member 142, while the hub member 142 has therein a passage 209 opening to the area within the hub member and leading to the areas within the rings 146 and 150. Accordingly, lubricant under pressure supplied to the passage 200 flows through the branch passage 208 and the passage 209 and thus to the radially inner surfaces of the clutch plates and out through the clutch plates to the area within the drums 152 and 158, from which the lubricant escapes to the area within the transmission housing.

In operation, on the supply of liquid under pressure to the chamber 176 of the steering clutch assembly, the piston 170 is moved to the left, thereby compressing the plates of the left steer clutch 149 against the flange 144 with the result that force is transmitted between the driving and driven plates of the clutch and the drum 152 is driven from the steering clutch driving shaft 36. On rotation of the drum 152, the gear 165 drives the gear 166 with the result that gear 166 turns the associated bevel gear 114 and it rotates the bevel gears 107 and 112 of the reaction gear unit 102, and thus causes the sun gears 94 and 96 to be driven in opposite directions so as to relatively accelerate the output shaft 98 and relatively retard the output shaft 100 and thereby cause the vehicle to turn to the left.

In like manner, on the supply of liquid under pressure to the chamber 177, the piston 170 is moved to the right, as viewed in Figure 2 of the drawings, thereby compressing the driving and driven plates of the right steer clutch 148 against the flange 135 on the driving shaft 36. As a result force is transmitted from the steering clutch driving shaft 36 through the clutch plates to the drum 158 so that the gear 162 drives the gear 164 and it in turn drives the bevel gear 115 and causes it to rotate the gears 112 and 107 of the reaction gear unit 102. On this rotation of the gears 107 and 112, the sun gears 94 and 96 are rotated in opposite directions so as to relatively accelerate the output shaft 100 and to relatively retard the output shaft 98 and thus cause the vehicle to turn to the right.

The degree of engagement of the right and left steer clutches, and, therefore, the rate of rotation of the drums 152 and 158, and the amount of turning of the vehicle, varies with variations in the effective force employed to press the plates of a steering clutch together. The control system provided by this invention is arranged to insure that the effective force available to press the plates of the steering clutches together may be accurately and gradually regulated so that the rate of turning of the vehicle can be carefully and skillfully controlled.

Figure 3:
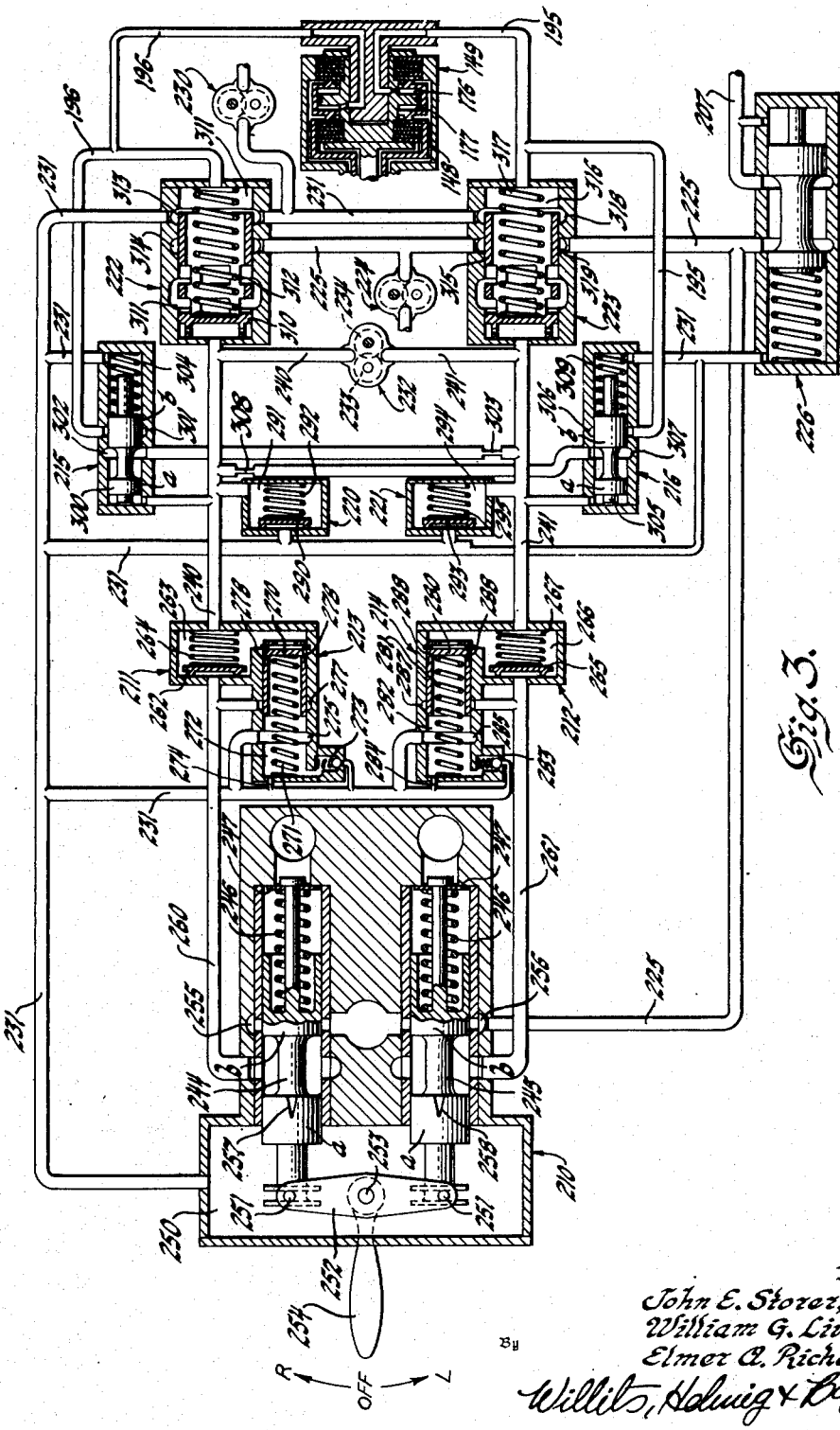
Figure 3 is a diagram of the control system provided by this invention.
Figure 4:
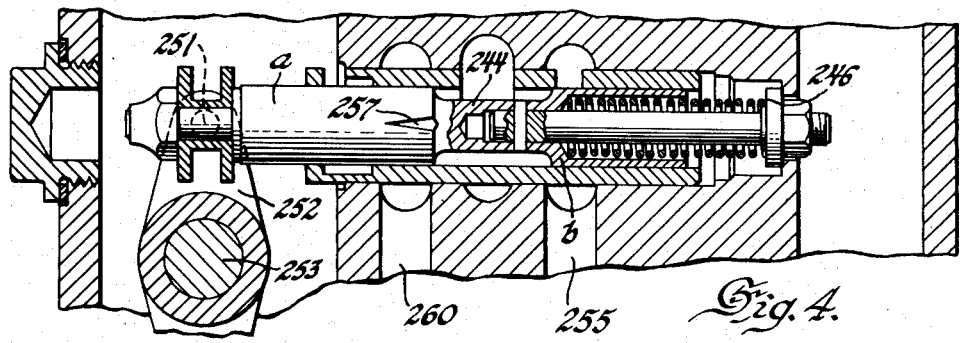
Figure 4 is a fragmentary enlarged view of one of the manually operated control valves employed in this control system.
Figure 5:
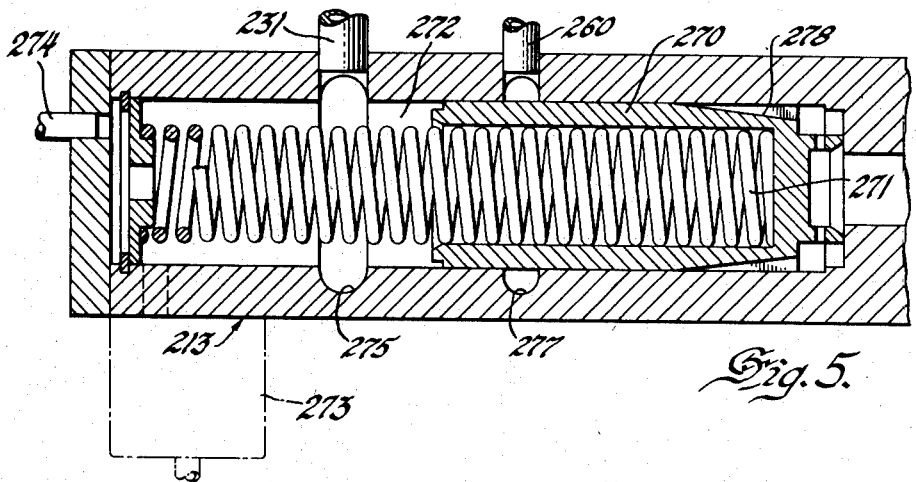
Figure 5 is a fragmentary enlarged view of one of the dash pot valves employed in this control system.
Figure 6:
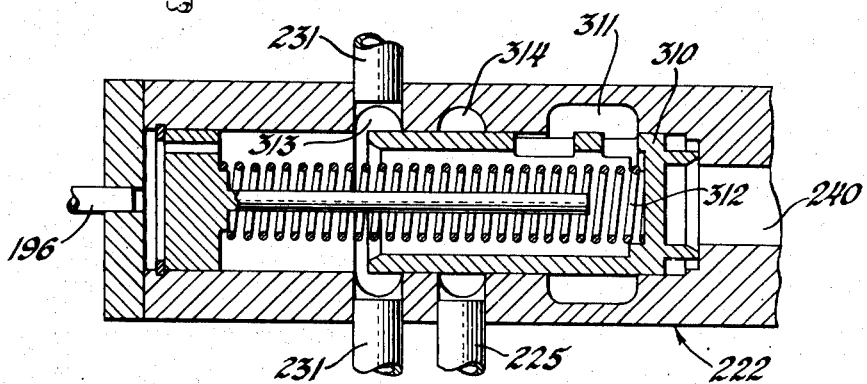
Figure 6 is a fragmentary enlarged view of one of the relay valves employed in this control system.

The control system provided by this invention is shown diagrammatically in Figure 3 of the drawings. As shown, the control system comprises a steering valve indicated generally by the reference numeral 210, a right blocker valve 211, a left blocker valve 212, a right dash pot valve 213, a left dash pot valve 214, a right intercepter valve 215, a left intercepter valve 216, a right pump feed valve 220, a left pump feed valve 221, a right relay valve 222, and a left relay valve 223.

The control system also includes a pump 224, which may be driven in any suitable manner by the vehicle engine, and which supplies liquid under relatively high pressure, such as 140 pounds to the square inch, to a supply pipe 225, one branch of which leads to the steering valve 210, and another branch of which leads to the right and left relay valves 222 and 223. In addition, another branch of the supply pipe 225 leads to a reducing valve indicated generally by the reference numeral 226, and in which the pressure of the liquid is reduced from the relatively high value of 140 pounds to the square inch to an intermediate value of 50 pounds to the square inch. The liquid from the reducing valve 226 is supplied to a pipe which connects with the pipe 207 of the clutch assembly, which is shown in Figure 2 of the drawings.

The control system also includes a pump 230 which may be driven in any suitable manner by the vehicle engine and which operates to supply lubricant under pressure to a pipe 231 at a relatively low pressure, such as 30 pounds to the square inch. The pipe 231 has numerous branches which are connected to portions of the steer valve 210, the dash pot valves, the pump feed valves, the intercepter valves, and the relay valves.

The pumps 224 and 230 are supplied with lubricant or liquid from a suitable source such as the sump, not shown, in the bottom of the transmission housing.

This control system also includes a pump 232, which as shown is a gear type pump, but may be of any suitable positive displacement type of pump. The pump 232 is driven from an element associated with the reaction gear unit 102 so that the gears of the pump 232 rotate when and only when there is a difference in the speed of the tracks on opposite sides of the vehicle. The means for driving the pump 232 is also arranged so that the rate of rotation of the gears of the pump varies in accordance with the difference in the speed of the tracks on opposite sides of the vehicle. In addition as hereinafter explained, the means for driving the gears of the pump 232 is arranged so that the pump gears turn in one relative direction when the speed of the right hand track exceeds that of the left hand track, and so that the pump gears turn in the opposite relative direction when the speed of the left hand track exceeds that of the right hand track.

Referring to Figure 1 of the drawings, it will be seen that the pump 232 is driven from the gear 166 secured to the gear 114 associated with the reaction gear unit 102. However, it is to be understood that this pump might be driven from any other suitable portion of the reaction gear unit or related structure, such as gears 162, 164, 165, or shafts 106 and 110.

As previously explained, the engine driven shaft 32 is assumed to rotate in the clockwise direction as viewed from the front. The steering clutch drive shaft 36 rotates in the same direction as the engine driven shaft 32, while each of the drums 152 and 158, when driven from the steering clutch drive shaft 36 through the associated clutch, rotates in the same direction as the steering clutch drive shaft 36. Hence, when the gear 166 is driven by the gear 165 associated with the drum 152 of the left steer clutch 149, the gear 166 rotates in the opposite direction to that of the steering clutch shaft 36. On the other hand, when the right steer clutch 148 is engaged, the gear 162 drives the gear 164 in the direction opposite to that in which the steering clutch shaft 36 rotates. The gear 164 turns gear 115, which rotates gears 107 and 112, thus causing gears 114 and 166 to rotate in the direction opposite to gears 164 and 115, and therefore in the same direction that the steering clutch shaft 36 is turning.

Accordingly, the gear 166 rotates in one direction when it is rotated as a result of engagement of the right steer clutch 148, while the gear 166 rotates in the other direction when it is rotated as a result of engagement of the left steer clutch 149.

The gears 233 and 234 of the pump 232 are directly driven from the gear 166 so that the direction of rotation of the pump gears depends upon the direction of rotation of the gear 166, and the pump gears turn in one relative direction when the vehicle is being turned to the left and turn in the opposite relative direction when the vehicle is being turned to the right.

The rate of rotation of the gears of the reaction gear unit 102, and therefore the rate of rotation of the gear 166, varies in accordance with the difference in the speed of the tracks on opposite sides of the vehicle. As the pump 232 is driven by the gear 166, the rate of operation of the pump varies with the rate of turn of the vehicle.

As hereinafter explained, the pump 232 and the driving means therefor are arranged and proportioned so that the volume of liquid transferred by the pump between the control pipes 240 and 241 is comparatively large in relation to the volume of the control pipes 240 and 241 and the chambers connected thereto. Hence, even at relatively low rates of turn of the vehicle, the pump 232 has substantial effect on the pressure of the liquid in the control pipes 240 and 241.

The chamber on one side of the meshing portion of the gears 233 and 234 of the pump 232 has connected thereto a branched control pipe 240 leading to the valves associated with the right steer clutch. Similarly, the chamber at the other side of the meshing portion of the gears 233 and 234 of the pump 232 has connected thereto a branched control pipe 241 leading to the valves associated with the left steer clutch.

The steering valve device 210 comprises a body having therein spaced parallel bores in which there are mounted movable valve elements 244 and 245, each of which has lands $a$ and $b$ which are separated by a portion of reduced diameter. Each valve element has associated therewith a coil spring 246 which extends between the valve element and a retainer 247 mounted on centrally located stem of the valve element. The retainers 247 engage shoulders on the body of the valve device so that each spring 246 is compressed on movement of the associated valve element against the spring, and so that each spring is effective to move the associated valve element only to the position in which the associated spring retainer is restrained by the stem on which it is mounted.

The chambers in which the springs 246 are mounted are constantly connected to the sump through suitable passages formed in the valve body.

The ends of the valve elements 244 and 245 extend into a chamber 250 formed in the body of the valve device and to which is connected a branch of the pipe 231 leading from the lubricant pump 230. Hence, the chamber 250 is normally filled with lubricant under pressure at the pressure supplied by the pump 230, which is assumed to be 30 pounds to the square inch.

The ends of the valve elements 244 and 245 within the chamber 250 have annular grooves therein which are adapted to receive the pins 251 on the ends of a rocker arm 252 which is mounted on a shaft 253. The shaft 253 extends through a wall of the chamber 250 and has secured thereto the operating handle 254 which is adapted to be held by the hand of an operator. The handle 254 may be biased by a suitable means, not shown, to an intermediate or "off" position, and is movable in one direction therefrom through a right hand zone and in the other direction therefrom through a left hand zone.

The various parts of the steering valve device 210 are arranged and proportioned so that when the handle 254 is in its intermediate or "off" position, the valve elements 244 and 245 are held by the associated springs 246 in the position in which the lands $b$ of these valve elements block the grooves 255 and 256 to which are connected a branch of the pipe 225 leading from the pump 224.

The land $a$ of the valve element 244 has formed in the surface thereof a metering groove 257 which opens to the area between the lands $a$ and $b$ of the valve element. The groove 257 is tapered and decreases both in width and depth, and therefore in flow capacity, away from the end of the land $a$ nearest the land $b$. The groove 257 is of such length that it does not extend to the chamber 250 when the valve element 244 is in the position which it occupies when the handle 254 is in its intermediate or "off" position.

The land $a$ of the valve element 245 has formed therein a metering groove 258 which is similar to the metering groove 257 in the valve element 244.

The area between the lands $a$ and $b$ of the valve element 244 is connected by a pipe 260 with the right blocker valve 211 and the right dash pot valve 213. Similarly, the area between the lands $a$ and $b$ of the valve element 245 is connected by a pipe 261 with the left blocker valve 212, and the left dash pot valve 214.

The right blocker valve 211 comprises a valve element 262 which is mounted in a chamber 263 to which is connected a branch of the pipe 240 leading from the pump 232. The valve element 262 has on a face thereof an annular seat rib which is adapted to engage a seat surrounding the end of the pipe 260 leading from the steering valve device, while the valve element 262 is yieldingly urged to the seated position by means of a coil spring 264. The coil spring 264 is of such size that it maintains the valve element 262 in the seated position until the pressure of the liquid in the pipe 260 builds up to a relatively small value, such as 2¾ pounds to a square inch, in excess of the pressure of the liquid present in the chamber 263.

The left blocker valve 212 is similar in construction to the right blocker valve 211 and has a valve element 265 mounted in a chamber 266 and yieldingly urged to the seated position by a coil spring 267.

The right dash pot valve 213 comprises a movable valve element 270 mounted in a body and having its closed end subject to the pressure of the liquid in the chamber 263. The valve element 270 is moved towards the chamber 263 by means of a coil spring 271 mounted in the chamber 272 at the face of the valve element 270. The chamber 272 is connected to a branch of the lubricant supply pipe 231 through a check valve 273 arranged to permit lubricant to flow from the pipe 231 to the chamber 272, and to prevent flow of lubricant in the opposite direction. The chamber 272 is also connected to the lubricant supply pipe 231 through a pipe 274 of restricted flow capacity, while a groove 275 surrounds the bore in which the valve element 270 is located and has connected thereto a branch of the lubricant supply pipe 231.

The groove 275 is located at an intermediate point in the body of the valve device and is cut off from the chamber 272 on a predetermined amount of movement of the valve element 270 against the spring 271, as hereinafter explained.

The body of the valve device also has formed therein a groove 277 surrounding the bore in which the valve element 270 is located. A branch of the pipe 260 is connected to the groove 277.

The surface of the movable valve element 270 has therein a plurality of metering grooves 278, each of which opens on the end of the valve element exposed to the chamber 263. Each of the grooves 278 is tapered and decreases in width and in depth, and therefore in flow capacity, away from the chamber 263.

The grooves 278 extend away from the closed end of the valve element 270 a substantial distance, but do not extend to the groove 277 when the valve element is in the position in which it is normally held by the spring 271. The various parts of the dash pot valve device are arranged and proportioned so that on movement of the valve element 270 against the spring 271 far enough to substantially close communication from the chamber 272 to the groove 275, and thus to the lubricant pipe 231, the small ends of the grooves 278 have just begun to register with the groove 277. In addition, the various parts of the valve device are proportioned so that the liquid under pressure in the chamber 263 must build up to a substantial pressure, such as 10 pounds to a square inch, in order to move the valve element 270 against the spring 271 to the position to close the groove 275.

The left dash pot valve 214 is similar in construction to the right dash pot valve 213. The valve 214 has a movable valve element 280 mounted in a bore in the body of the valve device and having its closed end subject to the pressure of the fluid in the chamber 266. The valve element 280 is moved towards the chamber 266 by the coil spring 281 which is mounted in the chamber 282 which is connected to the lubricant supply pipe 231 through a check valve 283 arranged to permit lubricant to flow from the lubricant supply pipe 231 to the chamber 282 and to prevent flow of lubricant in the opposite direction. The chamber 282 is constantly connected with the lubricant supply pipe 231 through a passage or choke 284 of restricted flow capacity, while the bore in the body of the valve device has therein a groove 285 to which is connected a branch of the pipe 231. In addition, the body of the valve device has therein a groove 287 to which is connected a branch of the pipe 261 leading from the steering valve device 210.

The movable valve element 280 has formed in the face thereof a plurality of metering grooves 288 which are similar to the counterpart grooves 278 in the valve element 270.

The right pump feed valve 220 comprises a valve element 290 mounted in a chamber 291 to which is connected a branch of the pipe 240. The valve element 290 is urged to the seated position by a coil spring 292, while the valve element 290 has an annular seat rib surrounding a branch of the lubricant supply pipe 231. The various parts of this valve device are arranged and proportioned so that the valve element 290 remains in the seated position until the pressure in the chamber 291 is reduced below that in the lubricant supply passage 231 a predetermined small amount, such as 2¾ pounds.

The left pump feed valve 221 is similar in construction to the right pump feed valve 220 and has a valve element 293 which is mounted in a chamber 294 and is urged to the seated position by a spring 295.

The right intercepter valve 215 comprises a movable valve element 300 which is mounted in a bore in a body and which has lands $a$ and $b$ which are separated by a portion of reduced diameter. The end face of the land $a$ is subject to the pressure of the liquid in a chamber to which is connected a branch of the control pipe 240, while the end face of the land $b$ is subject to the pressure of the liquid in a chamber to which is connected a branch of the lubricant supply pipe 231. The body of the valve device has therein a groove 301 to which is connected a branch of the pipe 196 leading to the chamber 177 of the right steer clutch 148, while the body of the valve device also has formed therein a groove 302 which is connected through a choke or restriction 303 to the control pipe 241 leading from the pump 232. The valve element 300 is yieldingly urged by a spring 304 to the position in which the land $b$ blocks the groove 301.

The left intercepter valve 216 is similar in construction to the right intercepter valve and comprises a movable valve element 305 which is mounted in a bore in a body and is provided with lands $a$ and $b$ which are connected by a portion of reduced diameter. The body of the valve device has formed therein a groove 306 to which is connected a branch of the pipe 195 leading to the chamber 176 of the left steer clutch 149, while the body of the valve device also has formed therein a groove 307 which is connected through a choke 308 with the pipe 240 leading from the pump 232. The valve element 305 is subject to the opposing pressures of the fluid in a chamber at the end face of the land $a$ to which is connected a branch of the pipe 241, and of the chamber at the end face of the land $b$ to which is connected a branch of the lubricant supply pipe 231. The valve element 305 is yieldingly urged by a coil spring 309 to the position in which the land $b$ blocks the groove 306.

The right relay valve 222 comprises a movable valve element 310 mounted in a bore in a body. The valve element 310 is tubular and has a closed end, one face of which is subject to the pressure of the fluid in a chamber to which the control pipe 240 is connected, and the other face of which is subject to the pressure of the liquid within the chamber 311 in which the valve element is mounted and to which is connected the pipe 196 leading to the chamber 177 of the right steer clutch 148.

A coil spring 312 is mounted in the chamber 311 and yieldingly urges the valve element 310 to the left as shown in the drawings. The body of the valve device has therein a groove 313 surrounding the bore in which the valve 310 is mounted and to which is connected a branch of the pipe 231 leading from the lubricant supply pump 230. In addition, the body of the valve device has therein a groove 314 to which is connected a branch of the pipe 225 leading from the high pressure pump 224. The grooves 313 and 314 are located so that when the valve element 310 is at the extreme left hand end of its range of movement, the open end of the valve element 310 partially closes the groove 313, while the skirt of the valve element completely closes the groove 314. Accordingly, at this time lubricant flows from the pipe 231 to the groove 313 and thence to the chamber 311 and the pipe 196, and also to the connecting passages.

The spring 312 is of such size that the liquid in the control pipe 240 leading to the chamber at the face of the valve 310 must build up to a substantial value, such as 10 pounds to the square inch, higher than the pressure of the liquid present in the chamber 311 in order to move the valve 310 against the spring 312.

The relay valves 222 and 223 also serve as pressure relief valves for the control pipes 240 and 241. If, for example, the pressure of the liquid in the control pipe 240 exceeds the pressure of the liquid in the passage 196 by more than a predetermined amount, the valve element 310 will be moved against the spring 312 so that the head or closed end of the valve moves into the enlarged intermediate portion of the bore in which the valve element is mounted. This permits liquid from the control pipe 240 to flow around the valve element to the passage 196, thus reducing the pressure of the liquid in the pipe 240 and permitting the spring 312 to return the valve element 310 to the position to cut off flow of liquid from the control pipe 240 to the passage 196. The relay valve 223 operates in a similar manner to permit liquid to flow from pipe 241 to the passage 195 in the event that the pressure on the liquid in the pipe 241 exceeds the pressure on the liquid in the passage by more than a predetermined amount. Hence, the relay valves 222 and 223 serve to relieve temporary pressure increases which may develope in the control pipes 240 and 241 under some conditions.

The left relay valve 223 is similar in construction to the right relay valve 222 and has a movable valve element 315 mounted in a bore in a body and having at one face thereof a chamber to which is connected a branch of the control pipe 241. The other face of the closed end of the valve element 315 is subject to the pressure of the fluid in a chamber 316. A spring 317 mounted in the chamber 316 moves the valve element 315 to the left, as viewed in the drawings. The body of the valve device has formed therein a groove 318 to which is connected a branch of the lubricant supply pipe 231, while the body of the valve device also has formed therein a groove 319 to which is connected a branch of the pipe 225 leading from the high pressure pump 224. The various parts of this valve device are arranged and proportioned so that when the movable valve element 315 is in the position in which it is held by the spring 317, the end of the valve element 315 partially closes the groove 318 and lubricant from the pipe 231 may flow to the chamber 316, and thus to the pipe 195 and connecting passages. In addition, in this position of the valve element 315, the groove 319 is completely blocked.

The various valve devices are shown in Figure 3 of the drawings in the positions which they assume when the vehicle is being operated in a straight path. At this time it is assumed that the lubricant supply pump 230 operates and supplies lubricant under a pressure of 30 pounds to the square inch to the pipe 231. Hence, lubricant flows from this pipe to the chamber 311 of the right relay valve device 222 and thence through pipe 196 to the chamber 177 of the right steer clutch 148. Similarly, lubricant flows from pipe 231 to the chamber 316 of the left relay valve device 223, and thus to the pipe 195 leading to the chamber 176 of the left steer clutch 149. Accordingly, the pressure in the two chambers of the steer clutch mechanism are equal, and equal opposing forces are exerted on the piston 170 with the result that the piston is held in its intermediate position by the associated coil springs 182 and does not exert force to compress the plates of either of the two clutches.

In addition, at this time lubricant from the lubricant supply pipe 231 flows past the valve element 290 of the right pump feed valve 220 to the control pipe 240 and maintains the pressure of the lubricant in this pipe at a value somewhat below the pressure present in the lubricant supply pipe 231. Similarly, lubricant flows past the valve element 293 of the left pump feed valve 221 and charges the control pipe 241 with lubricant at a pressure slightly below that in the pipe 231.

At this time the movable valve elements of the relay valve devices 222 and 223 are maintained in the positions in which they are shown in the drawings, by the associated coil springs, and by the lubricant in the chambers 311 and 316 which may be at a slightly higher pressure than the lubricant in the chambers at the opposite faces of these valve elements.

Lubricant supplied to the lubricant supply passage 231 also flows to the chambers 272 and 282 of the right dash pot valve 213 and the left dash pot valve 214, respectively. Lubricant from the pipe 231 also flows to the chamber 250 of the steering valve device 210.

When the operator of the tank wishes to turn the tank, he may do so by moving the handle 254 in the direction in which he wishes the tank to turn. The rate at which the tank turns may be varied by varying the amount of movement of the handle 254 away from its "off" position.

For purposes of illustration it will be assumed that the operator wishes the tank to turn to the right, and that he therefore moves the handle 254 to the right. On this movement of the handle 254, the valve element 244 is moved against the associated spring 246, while the valve element 245 is moved in the opposite direction in the bore in the valve device. On this movement of the valve element 244, the land b is moved to the position in which it no longer blocks the groove 255 with the result that lubricant under relatively high pressure supplied through the pipe 225 flows to the area between the lands a and b of the valve element and thence to the pipe 260. On the resulting increase in the pressure of the lubricant in the pipe 260, the valve element 262 of the right blocker valve device 211 is moved away from its seat and lubricant from the pipe 260 flows to the chamber 263 and to the connecting control pipe 240 leading to the right relay valve device 222.

As a result of the supply of lubricant to the pipe 240 there is an increase in the pressure of the fluid present therein, and a corresponding increase in the pressure of the fluid in the chamber at a face of the valve element 310 of the right relay valve device 222. However, this valve element is maintained in the position in which it blocks the groove 314 until the pressure of the fluid in the control pipe 240 builds up to a substantial value, such as ten pounds to the square inch, above that present in the chamber 311.

The valve element 244 does not meter or regulate the pressure of the fluid supplied to the pipe 260. Hence, the pressure in the pipe 260, and also in the control pipe 240, as well as in the passage 196 and in the clutch chamber 177, quickly builds up to a value approaching the full pressure of the fluid supplied by the high pressure pump 224. However, this increase in the pressure of the fluid in the clutch chamber 177 is not accompanied by a sudden, full engagement of the right steer clutch, because, as hereinafter explained, the pressure of the fluid in the clutch chamber 176 is also increased at this time and provides a force largely offsetting the force exerted by the fluid in the chamber 177.

On the supply of lubricant under pressure to the control pipe 240, lubricant flows to the chamber at one side of the gears 233 and 234 of the pump 232, but is prevented by the gears from flowing through the pump.

In addition, on the supply of lubricant under pressure to the pipe 240, the lubricant flows to the chamber at the face of the land a of the valve element 300 of the right intercepter valve 215 with the result that on a slight increase in the pressure of the lubricant in the control pipe 240, the valve element 300 is moved against the force of the spring 304 and of the lubricant in the chamber in which the spring is mounted. Accordingly, the valve element 300 is moved to the position in which communication is established between the grooves 301 and 302 so that lubricant supplied from a branch of the pipe 196 leading to the chamber 177 of the right steer clutch 148 flows through the choke or restriction 303 to the control pipe 241 and gradually increases the pressure of the liquid in this pipe and in the connecting chambers.

On an increase in the pressure of the lubricant in the chamber 263, the movable element 270 of the right dash pot valve 213 is moved against the associated spring 271, but this movement of this valve element has no significance and need not further be considered.

On an increase in the pressure of the fluid in the control pipe 241, there is an increase in the pressure of the fluid in the chamber 266 with the result that the movable element 280 of the left dash pot valve 214 is moved against the associated spring 281 and against the lubricant under pressure in the chamber 282. The force required to move the valve element 280 against the associated spring determines the rate of increase in the pressure in the control pipe 241 and prevents the pressure in this pipe from increasing too rapidly. The force exerted by the spring 281 and opposing movement of the valve element 280 increases as the spring is compressed. Hence, the force required to move the valve element 280 gradually increases, and the pressure of the liquid in the control pipe 241 increases gradually. When the pressure of the fluid in the pipe 241 has increased to a value approximately 10 pounds to the square inch in excess of the pressure present in the lubricant supply pipe 231, the valve element 280 will have been moved against the associated spring 281 and against the lubricant under pressure in the chamber 282 far enough to have closed the groove 285 with the result that further movement of the valve element 280 against the spring 281 is restricted to the rate at which lubricant from the chamber 282 may escape through the orifice 284. On this reduction in the rate of movement of the valve element 280, there is an increase in the rate of build up of pressure in the control pipe 241.

In addition, on movement of the valve element 280 to the position in which the valve element blocks the groove 285, the metering grooves 288 begin to communicate with the groove 287 and permit liquid to flow at a restricted rate from the pipe 241 to the pipe 261 leading to the steering valve device 210.

The delay which the left dash pot valve 314 interposes in the building up of pressure in the control pipe 241 enables the pressure of the fluid in the right steer clutch chamber 177 to build up more rapidly than pressure is built up in the left steer clutch chamber 176. Hence, the double acting piston which is subject to the opposing forces of the fluid in the chambers 177 and 176, is promptly effective to exert on the plates of the right steer clutch a moderate amount of force to cause engagement of this clutch.

When the pressure of the liquid in the control pipe 240 increases to a value more than 10 pounds to the square inch in excess of the pressure present in the chamber 311 of the right relay valve device 222, the valve element 310 is moved against the associated spring so that the element cuts off communication between the chamber 311 and the groove 313 associated with the lubricant supply passage 231. In addition, the valve element 310 is moved to the position in which it opens communication from the pipe 225 leading from the pump 224 with the result that liquid under high pressure is supplied from pipe 225 to the chamber 311, and thus flows through the pipe 196 to the chamber 177 in the steering clutch assembly with the result that the piston 170 compresses the discs of the right steer clutch 148 and causes the drum 158 to be driven from the steering shaft.

As previously pointed out, on the supply of liquid to the control pipe 240, the right intercepter valve 215 causes liquid to be supplied at a restricted rate through the choke 303 to the control pipe 241, while the left dash pot valve 214 retards the rate of increase in the pressure in the pipe 241, and therefore in the chamber at the face of the movable element 315 of the left relay valve 223.

However, after some delay, the pressure in the chamber at the face of the valve element 315 of the left relay valve 223 increases to a value sufficient to cause the valve element 315 to move to the position to cut off communication between the chamber 316 and the groove 318, and to open communication from the groove 319 to the chamber 316 so that liquid under high pressure from a branch of the pipe 225 flows to the chamber 316, and thus through the passage 195 to the chamber 176 of the steering clutch assembly.

Although the left relay valve 223 operates to supply liquid to the chamber 176 of the associated clutch at this time, the delay in the increase in the pressure in the control pipe 241 causes a corresponding delay in operation of the left relay valve 223 so that this valve does not supply liquid to the chamber 176 until after the right relay valve 222 has supplied liquid to the chamber 177.

The sequence of operation of the relay valves is such, therefore, that liquid under pressure may be supplied for a short period of time to the chamber 177 before liquid is supplied to the chamber 176. This insures that the chamber of the right steer clutch will be filled with liquid before the left relay valve 223 is operated to supply liquid to the chamber 176 of the left steer clutch. However, the delay in the supply of liquid to the left steer clutch 149 is relatively brief, and liquid will be supplied to the left steer clutch before the pressure of the fluid in the chamber 177 of the right steer clutch 148 has been built up to a value sufficient to cause the piston 170 to exert substantial force on the clutch plates of the right steer clutch. The liquid under pressure supplied at this time to the chamber 176 exerts force on the piston 170 opposing the force exerted by the liquid supplied to the chamber 177. The liquid supplied to the chamber 176, therefore, reduces the effective force available to move the piston, and prevents sudden rapid movement of the piston 170 in the direction to compress the plates of the right steer clutch 148. Hence, engagement of the right steer clutch, when it occurs, will be very gradual and soft, and will not cause the vehicle to lurch or suddenly change direction.

The right and left relay valves 222 and 223 operate in the well-known manner to regulate the pressure in the pipes 196 and 195, respectively, in accordance with the pressure in the pipes 240 and 241, respectively. As previously explained, on an increase in the pressure of the liquid in the pipe 240, the valve element 310 is moved against the associated spring 312 to cut off communication from the chamber 311 to the lubricant pipe 231, and to open communication between the high pressure supply pipe 225 and the chamber 311 so that there is an increase in the pressure of the liquid in the chamber 311. When the pressure in the chamber 311 has increased to a predetermined value below that present in the pipe 240, the valve element 310 is moved by the liquid in the chamber 311, and by the spring 312, to a position in which the valve element blocks the groove 314 to which the pipe 225 is connected, and in which the valve element also blocks the groove 313 to which the pipe 231 is connected. In this position of the valve element 310, therefore, it blocks both the supply of liquid to and the release of liquid from the chamber 311. On a subsequent change in the pressure of the liquid in the pipe 240, the valve element 310 is moved in the direction to release liquid from the chamber 311, or to permit liquid to be supplied thereto, so that the pressure of the liquid in the chamber 311 will change in accordance with the change in the pressure in the pipe 240.

The left relay valve 223 operates in a similar manner to regulate the pressure in the chamber 316 and in the connecting pipe 195 in accordance with variations in the pressure of the liquid in the pipe 241.

From the foregoing it is apparent that the pressure maintained by the ralay valves 222 and 223 on the liquid in the clutch chambers 177 and 176, respectively, varies in accordance with the pressure of the liquid in the control pipes 240 and 241. Hence, the force effective to apply a clutch varies in accordance with variations in the difference in the pressure of the liquid in the pipes 240 and 241.

It will be seen that when the steering control handle 254 is moved to the right, liquid under pressure is supplied to the pipe 240 to increase the pressure present therein, and to also increase the pressure of the liquid in the chamber at a face of the movable element 310 of the right relay valve device 222. However, the construction of the relay valve device 222 is such that it does not cause liquid under pressure to be supplied to the chamber 177 of the clutch until the pressure of the liquid in the pipe 240 has been increased a substantial amount.

On an increase in the pressure of the liquid in the pipe 240, and before this pressure has increased sufficiently to operate the relay valve device 222, the right intercepter valve 215 is operated to open the communication for supplying liquid from pipe 196 through the choke 303 to the pipe 241. Accordingly, liquid may flow from the pipe 196 associated with the chamber 177 of the clutch mechanism through the choke 303 to the control pipe 241. At this time the liquid in the pipe 196 is maintained substantially at the pressure of the lubricant in the pipe 231 by flow of liquid from the lubricant supply pipe through the relay valve 222 to the pipe 196. In addition, at this time the pipe 241 is at a pressure slightly below that of the lubricant supply pipe 231 since liquid is supplied from the lubricant supply pipe to the pipe 241 through the left pump feed valve 221 and a small pressure differential is required to operate this valve. Accordingly, on opening of the right intercepter valve 215, liquid may flow at a restricted rate from the pipe 196 to the pipe 241.

On continued increase in the pressure of the liquid in the pipe 240, the movable element 310 of the relay valve device 222 is moved against the associated spring with the result that communication between the lubricant supply pipe 231 and the pipe 196 is cut off and communication is established from the high pressure lubricant supply pipe 225 to the chamber in the valve device 222 and thus to the pipe 196. As a result, there is an increase in the pressure of the liquid in the pipe 196, and in the communicating chamber 177, while liquid continues to flow through the passage controlled by the right intercepter valve 215, and through the choke 303, to the pipe 241 to increase the pressure of the liquid therein and also in the chamber at the face of the left relay valve 223.

Because of the restricted rate of flow of liquid through the choke 303, and because of movement of the valve element 280 of the left dash pot valve 212, the pressure of the liquid in the pipe 241 increases at a relatively slow rate.

After the pressure in the pipe 241 has increased a small amount, the movable element 305 of the left intercepter valve 216 is moved to the position to establish communication through which liquid may flow from the pipe 240 through the choke 308 to the pipe 195. However, this flow is without consequence since the pipe 195 is open through left relay valve 223 to the lubricant supply pipe 231, and liquid supplied through the choke 308 to pipe 195 flows to the lubricant supply pipe and does not increase the pressure of the liquid in the pipe 195 and in the associated chamber 176.

It will be seen that the pressure of the lubricant in the pipe 240 must increase to a substantial value above that present in the pipe 196 before the relay valve device 222 operates to supply liquid under pressure to the pipe 196. Furthermore, it will be seen that after the intercepter valve 215 operates to establish communication to permit liquid to flow from the pipe 196 to the control pipe 241, the pressure of the liquid in the pipe 241 must increase to a substantial value above that present in the pipe 195 before the left relay valve device 223 operates to supply liquid to the pipe 195. In addition, when the left relay valve device 223 does operate to supply liquid to the pipe 195, the pressure of the liquid in the pipe 195 will be below the pressure of the liquid in the pipe 241. Hence, even when the pressure of the liquid in the pipe 241 is built up to the full value of that present in the pipe 196, the pressure of the liquid in the pipe 195 will be substantially below that present in the pipe 196, except as operation of the equipment is modified by operation of the pump 232, as hereinafter explained.

As a result of the operation of the right relay valve 222 and the left relay valve 223, liquid under pressure is supplied to the clutch chambers 177 and 176, respectively, but the pressure of the liquid in the chamber 177 substantially exceeds that present in the chamber 176 so the double acting piston 170 exerts substantial force to press the plates of the right steering clutch together.

As a result of engagement of the right steer clutch, the drum 158 is driven and rotates the gear 162 to rotate the gear 164 and thus turn gear 115 of the reaction gear unit 102. The various parts of the equipment are arranged so that on ratation of the gear 115, the sun gears 94 and 96 are turned in opposite directions, but so that the speed of the output shaft 100 driving the left hand track is relatively accelerated and the speed of the output shaft 98 driving the right hand track is relatively decreased, thereby causing the vehicle to turn to the right.

As heretofore explained, the direction and rate of rotation of the gears of the fluid displacement device or pump 232 are determined by the direction and rate of turning of the vehicle. Hence, the rate of transfer of liquid between pipes 240 and 241 by the pump 232 is determined by the rate of turning of the vehicle, while the direction of transfer of liquid is determined by the direction in which the vehicle is being turned. The various parts of the equipment are arranged so that when the vehicle is being turned to the right, the pump 232 transfers liquid from the control pipe 240 to the control pipe 241, and so that when the vehicle is being turned to the left the pump 232 transfers liquid from the control pipe 241 to the control pipe 240.

As it is assumed that the vehicle is being turned to the right, the pump 232 causes liquid to flow from the pipe 240 to the pipe 241, thereby increasing the pressure of the liquid in the pipe 241.

As a result of the increase in the pressure in the pipe 241, the left relay valve device 223 operates to supply liquid from the pipe 225 to the pipe 195 leading to the left clutch chamber 176. The increase in the supply of liquid under pressure to the chamber 176 of the left steer clutch, reduces the difference in the pressure of the liquid in these two chambers and correspondingly reduces the force exerted by the double-acting piston 170 to press together the plates of the right steer clutch 148. As a result of the reduction in the degree of engagement of the right steer clutch, there will be a corresponding reduction in the rate at which the gear 115 is driven, and therefore in the rate of rotation of the gear 166 with the result that there is a similar reduction in the rate of rotation of the gears 233 and 234 of the pump 232. Hence, the rate of transfer of liquid from the pipe 240 to the pipe 241 will be reduced.

As the pressure of the liquid in the pipe 241 increases, the movable element 280 of the left dash pot valve device 214 is moved against the associated spring. Initial movement of the valve element 280 is relatively rapid, but as soon as the valve element is moved to the position to cut off communication between the chamber 282 and the groove 285, further movement of the valve element 280 is relatively slow and is determined by the rate of flow of liquid from the chamber 282 through the restricted passage 284.

When the valve element 280 moves beyond the position in which it blocks the groove 285, the metering orifices 288 communicate with the groove 287 and permit liquid from the pipe 241 to flow to the pipe 261 leading to the steering valve device 210.

When the handle 254 of the steering valve device 210 is moved to the right far enough to cause liquid to be supplied to the pipe 260, the valve element 245 is moved in the bore in which it is mounted an amount sufficient that the end of the metering orifice 258 communicates with the chamber 250. The rate at which liquid may flow through the metering orifice 258 is determined by the position of the valve element 245, and increases with an increase in the amount of movement of the handle 254 away from its "off" position towards its right hand position. Accordingly, after movement of the handle 254 towards its right hand position, liquid may flow from the pipe 261 through the metering groove 258 to the chamber 250.

The initial flow of liquid from the pipe 241 to the pipe 261 is restricted by the flow capacity of the metering orifices 288 in the valve element 280 of the left dash pot valve 214. However, after the valve element 280 has been moved substantially all of the way against the associated spring 281, the flow capacity of the grooves 288 is greater than the flow capacity of the metering groove 258 in the valve element 245 of the steering valve device 210. Accordingly, after the valve element 280 has been moved substantially all of the way against the associated spring 281, the rate of escape of liquid from the pipe 241 is governed by the flow capacity of the metering orifice 258, and this is determined by the position of the handle 254.

As long as the handle 254 remains in the right hand zone, the valve element 244 permits liquid to flow from the high pressure supply pipe 225 to the pipe 260 and thus to the pipe 240. As a result of the continued supply of liquid to the pipe 240, the pressure therein tends to increase so the right relay valve device 222 tends to operate to supply liquid under pressure from the pipe 225 to the pipe 196 leading to the chamber 177 of the right steer clutch 148 to thereby maintain the pressure of the fluid in this chamber and maintain the degree of engagement of the right steer clutch 148.

In addition, as long as the handle 254 remains in the right hand zone, the valve element 245 is in the position in which the metering groove 258 permits liquid to escape from the pipe 241 to thereby reduce the pressure in the pipe 241 with the result that the left relay valve device 223 tends to release liquid under pressure from the pipe 195 and the chamber 176 of the left steer clutch 149. Accordingly, the pressure in the passage 195 and in the left steer clutch chamber 176 is maintained at a somewhat lower value than the pressure of the fluid in the right steer clutch chamber 177.

The liquid in the chamber 177 of the right steer clutch is under somewhat higher pressure than the liquid in the chamber 176 of the left steer clutch so the right steer clutch is engaged, the degree of engagement being governed by the difference in the pressure of the liquid in the chambers 177 and 176. As a result of engagement of the right steer clutch, the pump 232 operates as previously explained to transfer liquid from the pipe 240 to the pipe 241 to thereby increase the pressure in the pipe 241. If the vehicle tends to turn too rapidly, the pump 232 will supply liquid to the pipe 241 more rapidly than liquid may escape therefrom through the metering grooves 258 in the valve element 245 of the steering valve device 210. Under these conditions, the pressure of the liquid in the pipe 241 tends to increase, and the relay valve device 223 will operate to supply liquid under pressure to the pipe 195 to increase the pressure of the liquid therein and in the associated clutch chamber 176.

As a result of operation of the pump 232 to transfer liquid from the pipe 240 to the pipe 241, pressure of the liquid in the pipe 195 and in the associated clutch chamber 176 is increased, thereby reducing the differential in the pressures in the chambers 177 and 176, and correspondingly reducing the effective degree of engagement of the right steer clutch. This reduces the rate at which the sun gears 94 and 96 are driven, and correspondingly reduces the rate of rotation of the gear 166 so that there is reduction in the rate of rotation of the gears of the pump 232.

From the foregoing it will be seen that the pump 232 responds to the rate of turning of the vehicle and transfers liquid between the control pipes so as to increase the pressure of the liquid in the chamber opposing engagement of a clutch and thereby reduce the effective degree of engagement of the clutch. As the same time, liquid is released through the metering groove in one of the valve elements of the steering valve device 210 to reduce the pressure in the control pipe associated with the chamber opposing engagement of the clutch. Hence, if liquid is supplied by the pump 232 to the control pipe associated with the chamber opposing engagement of a clutch at a more rapid rate than liquid may be released therefrom through the metering grooves in the valve element of the steering valve device, the pressure of the liquid in the chamber opposing engagement of the clutch will increase and will cause the effective degree of engagement of the clutch to be reduced, thereby reducing the rate of turn of the vehicle and correspondingly reducing the rate of operation of the pump.

It will be seen, therefore, that under normal conditions, the rate of turn of the vehicle is determined by the rate at which liquid is released through the metering groove in one of the valve elements of the steering valve device. If the rate of turn of the vehicle exceeds the rate determined by the metering groove, the operation of the pump 232 will be such as to cause the pressure of the fluid in the chamber opposing engagement of the steering clutch to increase so the degree of engagement of the clutch is reduced. Similarly, if the rate of turn of the vehicle is less than that permitted by the groove in the valve element of the steering valve device, the operation of the pump 232 will be such that it will not supply sufficient liquid to the control pipe associated with the chamber opposing engagement of the clutch to maintain the pressure in that chamber and there will be an increase in the degree of effective engagement of the clutch.

Furthermore, because of the relatively small volume of the control pipes 240 and 241, and the relatively large capacity of the pump 232, the pressure of the fluid in the control pipes 240 and 241 is extremely responsive to the rate of turn of the vehicle. The variations in the pressure of the fluid in the control pipes 240 and 241 cause corresponding variations in the pressure of the fluid in the chambers 177 and 176 of the clutches to vary the degree of clutch engagement so the equipment operates with a high degree of accuracy to provide the intended rate of turn of the vehicle.

The flow capacity of the metering groove 258 varies with the position of the valve element 245 and increases with the amount of movement of the handle 254 away from its intermediate or "off" position. Hence, the rate of turn of the vehicle permitted is variable in accordance with the amount of movement of the handle 254.

The metering groove 258, and the other portions of the control system, are arranged and proportioned so that the maximum rate of turn of the vehicle permitted by the control system is substantially as great as the maximum rate of turn which can be provided by the driving means for the steering clutch driving shaft 36.

When the vehicle completes its turn and the operator returns the handle 254 to its intermediate or "off" position, the valve elements 244 and 245 are returned substantially to the positions in which they are shown in Figure 3 of the drawings in which the valve element 244 cuts off the supply of liquid under pressure to the pipe 260, and the valve element 245 cuts off the release of liquid from the pipe 261 through the metering groove 258.

When the supply of liquid under pressure to the pipe 260 is cut off, liquid ceases to flow therefrom to the pipe 240 with the result that the pump 232 quickly transfers sufficient liquid from the control pipe 240 to the control pipe 241 to substantially equalize the pressure in these two pipes. The equalization of the pressures in the two control pipes is particularly prompt in view of the fact that the release of liquid from the pipe 241 through the metering groove 258 has been cut off.

On the accompanying reduction in the pressure of the liquid in the pipe 240, and the increase in the pressure of the liquid in the pipe 241, the relay valve devices 222 and 223 operate to substantially equalize the pressure of the liquid in the chambers 177 and 176 with the result that substantially no force is exerted by the piston 170 to cause engagement of either clutch. Hence, the clutch 148 is promptly disengaged and ceases to drive the reaction gear unit 102.

Under some conditions, the pump 232 may reduce the pressure in the control pipe 240 below the pressure in the control pipe 241 with the result that the right relay valve device 222 will operate to release liquid from the pipe 196 and the right steer clutch chamber 177, while the left relay valve device 223 will operate to increase the pressure of the liquid supplied to the pipe 195 and to the left steer clutch chamber 176. Under these conditions the left clutch 149 will be applied and will exert force to drive the steering mechanism in the reverse direction to thereby insure that the turning movement of the vehicle ceases.

However, if any reverse movement of the steering shafts should occur, the pump 232 will be operated in the reverse direction and will transfer liquid from the pipe 241 to the pipe 240 so that the relay valve devices 222 and 223 operate to equalize the pressures in the chambers 176 and 177 and thereby terminate effective engagement of both steering clutches.

For purposes of illustration, it will be assumed that when the control handle 254 is returned to the "off" position to discontinue the right hand turn, that the continued operation of the pump 232 transfers liquid from the control pipe 240 to the control pipe 241 to effect engagement of the left steer clutch 149 so that the left steer clutch serves as a brake and stops rotation of the elements of the steering mechanism without causing reverse operation of the steering mechanism or of the pump 232.

The equalization in the pressure of the liquid in the various parts of the control system which takes place at this time, occurs so rapidly that the pressure in the left steel clutch chamber is normally relieved before this steer clutch can cause reverse rotation of the steering mechanism.

Under the conditions outlined, the liquid in control pipe 241 is at a high pressure, and the liquid in the control pipe 240 is at a low pressure, while the pressure in pipe 196 is less than that in control pipe 240 and the pressure in pipe 195 is less than that in control pipe 241.

The relatively high pressure of the liquid in control pipe 241 moves the valve element 305 of the left intercepter valve 216 to the right against the spring 309 so the liquid from the pipe 195 flows through the left intercepter valve 216, and thence through the orifice 308 to the control pipe 240 to reduce the pressure in the pipe 195 and to increase the pressure of the liquid in the pipe 240. On this increase in the pressure of the liquid in the pipe 240, the valve element 300 of the right intercepter valve 215 is moved to the right against the spring 304 so that liquid flows from control pipe 241 through the orifice 303 and the right intercepter valve 215 to the pipe 196, thereby reducing the pressure in pipe 241 and increasing the pressure in pipe 196.

As a result of the increase in the pressure of the liquid in control pipe 240, the right relay valve 222 operates to supply liquid to pipe 196 to increase the pressure therein, and in chamber 177 so that the effective degree of application of the left steer clutch is reduced. At this time the pipe 240 is supplied from pipe 195 leading to the left steer clutch, so that the pressure in pipe 240 will build up to the pressure present in pipe 195. However, the relay valve device 222 supplies to the pipe 196 liquid at a pressure ten pounds to the square inch less than that present in pipe 240 so the pressure in the right steer clutch chamber 177 is high enough to substantially offset the pressure in the left steer clutch chamber but is not high enough to cause engagement of the right steer clutch.

As just explained, the relay valve 222 operates to cause the pressure in the pipe 196 to be 10 pounds to the square inch below that present in pipe 240, and also in pipe 195. At this time the pressure in pipe 241 is 10 pounds to the square inch above that present in pipe 195, and therefore is 20 pounds to the square inch above that present in pipe 196, so that liquid continues to flow from pipe 241 through the orifice 303 and the right intercepter valve 215 to the pipe 196 to reduce the pressure in the pipe 241 and to increase the pressure in the pipe 196.

As a result of the reduction in the pressure of the fluid in pipe 241, the relay valve 223 operates to release fluid from the pipe 195 and from the left steer clutch chamber 176, thus reducing engagement of the left steer clutch. As a result of the supply of fluid to passage 196, the movable element 310 of the right relay valve 222 is moved to the left to permit fluid to flow from passage 196 to the lubricant supply pipe 231.

As a result of the reduction in the pressure in the control pipe 241, and consequent release of fluid by the relay valve 223 from the pipe 195, the pressure of the fluid in the pipe 195 is reduced below that present in the control pipe 240 so that liquid from the control pipe 240 now flows through the orifice 308 and the left intercepter valve 216 to the pipe 195. This increases the pressure of the liquid in the pipe 195 and causes the valve element 315 of the left relay valve 223 to move to the left and permit fluid from the pipe 195 to flow to the lubricant supply pipe 231.

The right intercepter valve 215 remains open and permits fluid from the control pipe 240 to flow to pipe 195 and thus to the lubricant supply passage 231, until the pressure in the pipe 240 is reduced to a small value in excess of that present in the lubricant supply passage. Similarly, the left intercepter valve 216 remains open and permits fluid from the control pipe 241 to flow to pipe 196, and thus to the lubricant supply passage 231, until the pressure in the pipe 241 is reduced to a small value in excess of that present in the lubricant supply passage. In this manner, at the completion of a steer, the pressure in the two control pipes equalizes at a value slightly higher than that present in the lubricant supply passage. This pressure differential is so small as to be without significance.

As explained above, at the completion of a turning movement the equipment operates automatically to equalize the pressures in the clutch chambers 176 and 177 and thus insure release of both steering clutches. This control of the pressures in the clutch chambers 176 and 177 is achieved by controlling the pressure of the liquid in the control passages 240 and 241, and when the pressures in the control passages 240 and 241 are equal, the pressures in the clutch chambers 176 and 177 are also equal.

In addition, as explained above, a substantial pressure differential is required to operate the relay valve devices. Hence, the relay valve devices 222 and 223 operate in such manner that the fluid in the passages 196 and 195 is reduced to that present in the lubricant supply pipe 231, while the pressure in the passages 196 and 197 is reduced to this value, the pressure of the fluid in the control pipes 240 and 241 is at a pressure somewhat higher than that present in the lubricant supply pipe. As long as the pressure of the fluid in a control pipe is appreciably higher than that in the lubricant supply pipe, the intercepter valve associated with the control pipe is open, thereby permitting fluid to flow from the other control pipe to the passage leading to the clutch chamber associated with the first control passage. The flow of fluid from the control passages through the intercepter valves is restricted by the chokes in these passages, so the pressures in the control passages reduce gradually. As the pressures in the control passages reduce, the valve elements of the dash pot valves 213 and 214 are moved by the associated springs to their initial positions.

When the pressure of the fluid in a control passage is reduced to a value slightly higher than that present in the lubricant supply passage, the intercepter valve associated with the control passage closes, thereby cutting off release of fluid from the other control passage.

The volume of the control passages 240 and 241, and connected passages is so small, and the flow capacity of the various valve devices is so large that the equalization of pressures in the various parts of the system on completion of a turning movement takes place very rapidly. Hence, the steering clutch for the direction of turning opposite to that in which the vehicle has been turned becomes engaged momentarily to serve as a brake, but becomes released before it can cause the vehicle to turn in the opposite direction.

The equipment operates in substantially the same manner on movement of the control lever 254 to the left to cause the vehicle to turn to the left, and a detailed description of the operation of the equipment at this time is unnecessary.

Vehicles of the type for which this steering control system was developed are sometimes employed as bulldozers, and, when employed in this service, one tread of the vehicle may be suddenly lifted from the ground at a time when substantial driving force is being transmitted to this vehicle tread. With steering control systems of the type heretofore employed, a vehicle tread, when lifted from the ground in this manner, tended to be driven very rapidly with the result that the various mechanisms within the transmission, and relating to the steering of the tank, were driven. Because of the relatively high gear ratios employed in the transmissions, the portions of the steering mechanism, when driven in this manner, might be operated at extremely high speeds with the result that serious damage might result to the transmission.

This steering control system eliminates the possibility of damage to the transmission under these conditions and operates automatically to limit the rate of rotation of the steering shafts.

For purposes of illustration, it will be assumed that the tank is being operated in a straight line and that one of the vehicle treads is lifted from the ground at a time when power is being applied thereto. Under these conditions, the relay valve devices 222 and 223 connect the clutch chambers 176 and 177 to the lubricant supply pipe 231 so that both clutch chambers are filled with liquid at the pressure of a liquid in the lubricant supply pipe. In addition, under these conditions, the pipes 240 and 241 are charged with liquid under pressure through the right and left pump feed valves 220 and 221.

When one of the vehicle treads is lifted from the ground and starts to operate at a higher speed than the other vehicle tread, the bevel gears 114 and 115 are rotated with the result that the gear 166 turns and the pump 232 is driven. The direction of rotation of the gears of the pump 232 will be such as to cause liquid to be supplied to the one of the control pipes 240 and 241 which will cause engagement of the one of the steering clutches which will cause force to be transmitted from the steering clutch driving shaft to rotate the one of the steering shafts 106 and 110 in the direction opposite to that in which it is being rotated as a result of movement of the vehicle tread. In other words, the action of the pump 232 is to transfer liquid to the one of the control pipes 240 or 241 which will result in application of the steering clutch which will oppose the rotation of the members of the steering reaction gear unit 102 and associated elements.

Under the conditions described, the pump 232 will operate at a relatively rapid rate so there will be a sudden increase in the pressure of the liquid in one of the control pipes 240 or 241, and a corresponding sudden increase in the pressure of the liquid in the pipe 196 or 195 and in the associated chamber 176 or 175. Hence, the piston 170 of the steering clutch mechanism will promptly cause the proper one of the steering clutches to engage and will cause this clutch to be engaged to a degree effective to transmit to the reaction gear unit 102 torque of substantial value.

The force applied to the reaction gear unit 102 as a result of engagement of one of the steering clutches stops, or greatly reduces the rate of rotation of the steering shaft, and prevents damage which might otherwise occur to the transmission. Furthermore, because of the small volume of the control pipes 240 and 241, and the large capacity of the pump 232, a difference in the speeds of the tracks on opposite sides of the vehicle is promptly detected and the counteracting force is quickly applied. Hence, the reaction gear unit 102 and related parts are prevented from reaching speeds which might be dangerous.

In addition, because of this automatic detection of unintended differences in the speed of the driving members on opposite sides of the vehicle, and the automatic application of a steering clutch to oppose and prevent these differences in the speed of the driving members, not only is the speed of the rapidly moving driving member curtailed, but, in addition, torque is applied to the other one of the driving members to cause it to drive the vehicle. This prevents the vehicle from losing driving ability when one of the driving members loses traction or adhesion with the ground.

On operation of the pump 232 to transfer liquid from one of the control pipes 240 or 241 to the other one of these pipes, liquid flows from the lubricant supply pipe 231 through one of the pump feed valve devices 220 or 221 to the control pipe from which liquid is transferred by the pump 232 so that both pipes are filled with liquid at all times.

When the rotation of the steering shafts is curtailed by engagement of one of the steering clutches, the pump 232 ceases to transfer liquid between the pipes 240 and 241, while there may be some transfer of liquid in the opposite direction in the event that engagement of the steering clutches produces rotation of the steering shafts 106 and 110. In any event, the intercepter valve associated with the control pipe to which liquid is supplied will be moved to the position to permit liquid to flow from a clutch chamber to the opposite control pipe and thereby equalize the pressure in the control pipes.

The automatic detection of unintended differences in the speed of the driving members on opposite sides of the vehicle which this control system provides, also causes the control system to operate to maintain the vehicle on the desired path even though obstacles or irregularities in the terrain tend to cause the vehicle to diverge from its intended course. For example, the vehicle may be operated along a straight road, but because of a crown in the road surface, or because of an irregularity in the road surface, the vehicle may tend to swerve to one side. As soon as there is any deviation in the movement of the vehicle away from the designated course, there will be a difference in the speed of the driving members on opposite sides of the vehicle with resultant operation of the pump 232 to transfer liquid from one control passage to the other. As explained above, this causes engagement of one of the steering clutches to not only retard the driving member which is rotating too rapidly, but to also apply torque to the driving member which is rotating too slowly. The operation of the steering clutch, therefore, is to prevent the undesired turning of the vehicle, and to compel the vehicle to follow the course designated by the vehicle driver.

Although we have herein illustrated and described one form of improved vehicle steering control system embodying our invention, it should be understood that the invention is not limited to these details of construction and operation, and that numerous changes and modifications may be made therein without departing from the spirit and scope of the following claims.

We claim:

1. In an improved transmission for a motor vehicle having an engine and having a first ground engaging means at one side and a second ground engaging means at the other side, said transmission comprising a first output shaft adapted to drive said first ground engaging means and a second output shaft adapted to drive said second ground engaging means, means for driving said first and second output shafts from said engine, a reaction gear unit connecting said first and second output shafts, a steering shaft, means for rotating said steering shaft, a first friction clutch effective when engaged to couple said steering shaft through said reaction gear unit to said output shafts so as to relatively accelerate said first output shaft and to relatively retard said second output shaft, a second friction clutch effective when engaged to couple said steering shaft through said reaction gear unit to said output shafts so as to relatively accelerate said second output shaft and relatively retard said first output shaft, a source of fluid of low pressure, a source of fluid of high pressure, a first clutch chamber adapted to contain fluid under pressure, a second clutch chamber adapted to contain fluid under pressure, a first control chamber adapted to contain fluid under perssure, a second control chamber adapted to contain fluid under pressure, means for each of said control chambers including a passage governed by a check valve for supplying fluid from said source of fluid of low pressure to said control chamber, manually operated valve means for at times causing fluid to be released from said first chamber at adjustably variable rates and for causing fluid under pressure to be supplied to said second chamber from said source of fluid of high pressure and for at other times causing fluid to be released from said second chamber at adjustably variable rates and for causing fluid under pressure to be supplied from said source of fluid of high pressure to said first control chamber, a first relay valve subject to the opposing pressures of the fluid in said first control and first clutch chambers, a second relay valve subject to the opposing pressures of the fluid in said second control and second clutch chambers, each of said relay valves being effective to connect the associated clutch chamber with said source of fluid of high pressure or with said source of fluid of low pressure according as the pressure of the fluid in the associated control chamber is more or less than a predetermined amount in excess of the pressure in the associated clutch chamber, means responsive to operation of said first output shaft at a more rapid rate than said second output shaft for supplying fluid to said second control chamber at a rate which varies in accordance with the difference in the speeds of said shafts, means responsive to operation of said second output shaft at a more rapid rate than said first output shaft for supplying fluid to said first control chamber at a rate which varies in accordance with the difference in the speeds of said shafts, means subject to the opposing pressures of the fluid in said first and second clutch chambers for causing engagement of said first clutch in amounts varying in accordance with the amount by which the pressure of the fluid in said first clutch chamber exceeds the pressure of the fluid in said second clutch chamber, and means for causing engagement of said second clutch in amounts varying in accordance with the amount by which the pressure of the fluid in said second clutch chamber exceeds the pressure of the fluid in said first clutch chamber.

2. The combination set forth in claim 1 wherein each control chamber has associated therewith an intercepter valve controlling a passage of restricted flow capacity connecting the associated clutch chamber and the remaining control chamber, each of said intercepter valves being biased to the closed position and being movable therefrom to the open position on an increase in the pressure of the fluid in the associated control chamber to a predetermined value above the pressure of the fluid in said source of fluid of low pressure.

3. The combination set forth in claim 1 wherein each control chamber has associated therewith expansible chamber means effective on initial supply of fluid under pressure to the associated control chamber to retard the rate of increase in said control chamber for a limited time interval.

4. The combination set forth in claim 1 wherein the means for causing engagement of said first and second clutches comprises a double acting piston.

5. The combination set forth in claim 1 wherein each of the relay valves is effective to establish communication between the associated control and clutch chambers on an increase in the pressure of the fluid in the associated control chamber to a predetermined value in excess of the pressure of the fluid in the associated clutch chamber.

6. The combination set forth in claim 1 wherein the means responsive to the relative speeds of the output shafts for supplying fluid to the control chambers comprises a positive displacement pump located in a passage connecting said control chambers.

7. The combination set forth in claim 6 wherein said pump is driven by said reaction gear unit.

8. In improved control means for a vehicle transmission of the type having a first output shaft for driving the ground engaging means at one side of the vehicle and a second output shaft for driving the ground engaging means at the other side of the vehicle and means for driving said output shafts from the vehicle engine, said transmission including a first friction device effective when actuated to cause said first output shaft to be driven at a rate varying in a predetermined manner from the rate at which said second output shaft is driven, a second friction device effective when actuated to cause said second output shaft to be driven at a rate varying in said predetermined manner from the rate at which said first output shaft is driven, the magnitude of the variation in the relative rates at which said output shafts are driven being variable in accordance with the degree of actuation of said friction devices, said control means comprising a manually operated control member having a neutral position from which it is movable in one direction through a first operating zone and from which it is movable in the opposite direction through a second operating zone, speed responsive means operative in accordance with the difference in the rate of rotation of said first and second output shafts, and means controlled jointly by said speed responsive means and by the direction and amount of movement of said control member away from said neutral position for variably actuating said first and second friction devices.

9. In improved steering control means for a motor vehicle having an engine, a first ground engaging means at one side and a second ground engaging means at the other side, and a transmission comprising a first output shaft adapted to drive said first ground engaging means and a second output shaft adapted to drive said second ground engaging means and including a rotatable member the direction and rate of rotation of which varies in accordance with the difference in the rate of the rotation of said first and second output shafts, means for driving said first and second output shafts from said engine, a steering shaft, means for rotating said steering shaft, a first friction clutch effective when engaged to couple said steering shaft to said output shafts so as to relatively accelerate said first output shaft and to relatively retard said second output shaft, and a second friction clutch effective when engaged to couple said steering shaft to said output shafts so as to relatively retard said first output shaft and to relatively accelerate said second output shaft, said steering control means comprising a first and a second chamber adapted to contain fluid under pressure, a reversible positive displacement pump for transferring fluid between said first and second chambers, means for driving said pump in timed relationship to said rotatable member, whereby said pump is driven in a direction determined by the relative rate of rotation of said output shafts and is driven at a rate determined by the difference in the rate of rotation of said output shafts, said pump being operative to transfer fluid from said first to said second chamber when the speed of the first output shaft exceeds the speed of the second output shaft and being effective to transfer fluid from said second chamber to said first chamber when the speed of said second output shaft exceeds the speed of the first output shaft, manually controlled valve means for at times causing fluid to be released from said first chamber at adjustably variable rates and for causing fluid under pressure to be supplied to said second chamber and for at other times causing fluid to be released from said second chamber at adjustably variable rates and for causing fluid under pressure to be supplied to said first chamber, and a movable abutment responsive to the opposing pressures of the fluid in said first and second chambers, said abutment being operative to cause engagement of said first clutch in amounts variable in accordance with the amount by which the pressure of the fluid in said first chamber exceeds the pressure of the fluid in said second chamber and being operative to cause engagement of said second clutch in amounts variable in accordance with the amount by which the pressure of the fluid in said second chamber exceeds the pressure of the fluid in said first chamber.

10. In improved steering control means for a motor vehicle having an engine, a first ground engaging means at one side, a second ground engaging means at the other side, and a transmission comprising a first output shaft adapted to drive said first ground engaging means and a second output shaft adapted to drive said second ground engaging means and including a rotatable member the direction and rate of rotation of which varies in accordance with the difference in the rate of the rotation of said first and second output shafts, means for driving said first and second output shafts from said engine, a steering shaft, means for rotating said steering shaft, a first friction clutch effective when engaged to couple said steering shaft to said output shafts so as to relatively accelerate said first output shaft and to relatively retard said second output shaft, and a second friction clutch effective when engaged to couple said steering shaft to said output shafts so as to relatively retard said first output shaft and to relatively accelerate said second output shaft, said steering control means comprising a first and a second chamber adapted to contain fluid under pressure, positive displacement pump means for transferring fluid between said first and second chambers, means for driving said pump means in timed relationship to said rotatable member, said pump means being operative to transfer fluid from said first to said second chamber when the speed of the first output shaft exceeds the speed of the second output shaft and being effective to transfer fluid from said second chamber to said first chamber when the speed of said second output shaft exceeds the speed of the first output shaft, manually controlled valve means for at times causing fluid to be released from said first chamber at adjustably variable rates and for causing fluid under pressure to be supplied to said second chamber and for at other times causing fluid to be released from said second chamber at adjustably variable rates and for causing fluid under pressure to be supplied to said first chamber, and a movable abutment responsive to the opposing pressures of the fluid in said first and second chambers, said abutment being operative to cause engagement of said first clutch in amounts variable in accordance with the amount by which the pressure of the fluid in said first chamber exceeds the pressure of the fluid in said second chamber and being operative to cause engagement of said second clutch in amounts variable in accordance with the amount by which the pressure of the fluid in said second chamber exceeds the pressure of the fluid in said first chamber.

11. In improved steering control means for a motor vehicle having an engine and having a first ground engaging means at one side and a second ground engaging means at the other side, a transmission comprising a first output shaft adapted to drive said first ground engaging means and a second output shaft adapted to drive said second ground engaging means, a reaction gear unit connecting said first and second output shafts and including a rotatable member the direction and rate of rotation which varies in accordance with the difference in the rate of the rotation of said first and second output shafts, means for driving said first and second output shafts from said engine, a steering shaft, means for rotating said steering shaft, a first friction clutch effective when engaged to couple said steering shaft through said reaction gear unit to said output shafts so as to relatively accelerate said first output shaft and to relatively retard said second output shaft, a second friction clutch effective when engaged to couple said steering shaft through said reaction gear unit to said output shafts so as to relatively retard said first output shaft and to relatively accelerate said second output shaft, said steering control means comprising a first and a second chamber adapted to contain fluid under pressure, positive displacement pump means for transferring fluid between said first and second chambers, means for driving said pump means in timed relationship to said rotatable member, said pump means being operative to transfer fluid from said first to said second chamber when the speed of the first output shaft exceeds the speed of the second output shaft and being effective to transfer fluid from said second chamber to said first chamber when the speed of said second output shaft exceeds the speed of the first output shaft, manually controlled valve means for at times causing fluid to be released from said first chamber at adjustably variable rates and for causing fluid under pressure to be supplied to said second chamber and for at other times causing fluid to be released from said second chamber at adjustably variable rates and for causing fluid under pressure to be supplied to said first chamber, and a movable abutment responsive to the opposing pressures of the fluid in said first and second chambers, said abutment being operative to cause engagement of said first clutch in amounts variable in accordance with the amount by which the pressure of the fluid in said first chamber exceeds the pressure of the fluid in said second chamber and being operative to cause engagement of said second clutch in amounts variable in accordance with the amount by which the pressure of the fluid in said second chamber exceeds the pressure of the fluid in said first chamber.

12. In improved steering control means for a motor vehicle having an engine, a first ground engaging means at one side, a second ground engaging means at the other side, and a transmission comprising a first output shaft adapted to drive said first ground engaging means, a second output shaft adapted to drive said second ground engaging member, means for driving said first and second output shafts from said engine, a steering shaft, means for rotating said steering shaft, a first friction clutch effective when engaged to couple said steering shaft to said output shafts so as to relatively accelerate said first output shaft and to relatively retard said second output shaft, and a second friction clutch effective when engaged to couple said steering shaft to said output shafts so as to relatively retard said first output shaft and to relatively accelerate said second output shaft, said steering control means comprising a first and a second chamber adapted to contain fluid under pressure, means responsive to operation of said first output shaft at a more rapid rate than said second output shaft for supplying to said second chamber fluid at a rate which varies in accordance with the difference in the speed of said shafts, means responsive to operation of said second output shaft at a more rapid rate than said first output shaft for supplying to said first chamber fluid at a rate which varies in accordance with the difference in the speed of said shafts, manually controlled valve means for at times releasing fluid from said second chamber at adjustably variable rates and for concurrently supplying fluid under pressure to said first chamber and for at other times releasing fluid from said first chamber at adjustably variable rates and for concurrently supplying fluid under pressure to said second chamber, and a movable abutment responsive to the opposing pressures of the fluid in a first chamber and of the fluid in a second chamber, said abutment being operative to cause engagement of said first clutch in amounts variable in accordance with the amount by which the pressure of the fluid in said first chamber exceeds the pressure of the fluid in said second chamber and being operative to cause engagement of said second clutch in amounts variable in accordance with the amount by which the pressure of the fluid in said second chamber exceeds the pressure of the fluid in said first chamber.

13. In improved steering control means for a motor vehicle having an engine, a first ground engaging means at one side, a second ground engaging means at the other side, and a transmission comprising a first output shaft adapted to drive said first ground engaging means, a second output shaft adapted to drive said second ground engaging member, means for driving said first and second output shafts from said engine, a steering shaft, means for rotating said steering shaft, a first friction clutch effective when engaged to couple said steering shaft to said output shafts so as to relatively accelerate said first output shaft and to relatively retard said second output shaft, and a second friction clutch effective when engaged to couple said steering shaft to said output shafts so as to relatively retard said first output shaft and to relatively accelerate said second output shaft, said steering control means comprising a first and a second chamber adapted to contain fluid under pressure, a positive displacement pump responsive to operation of said first output shaft at a more rapid rate than said second output shaft for supplying to said second chamber fluid at a rate which varies in accordance with the difference in the speed of said shafts, a positive displacement pump responsive to operation of said second output shaft at a more rapid rate than said first output shaft for supplying to said first chamber fluid at a rate which varies in accordance with the difference in the speed of said shafts, manually controlled valve means for at times releasing fluid from said second chamber at adjustably variable rates and for concurrently supplying fluid under pressure to said first chamber and for at other times releasing fluid from said first chamber at adjustably variable rates and for concurrently supplying fluid under pressure to said second chamber, and a movable abutment responsive to the opposing pressures of the fluid in a first chamber and of the fluid in a second chamber, said abutment being operative to cause engagement of said first clutch in amounts variable in accordance with the amount by which the pressure of the fluid in said first chamber exceeds the pressure of the fluid in said second chamber and being operative to cause engagement of said second clutch in amounts variable in accordance with the amount by which the pressure of the fluid in said second chamber exceeds the pressure of the fluid in said first chamber.

14. In improved steering control means for a motor vehicle having an engine, a first ground engaging means at one side, a second ground engaging means at the other side, and a transmission comprising a first output shaft adapted to drive said first ground engaging means, a second output shaft adapted to drive said second ground engaging means, means for driving said first and second output shafts from said engine, a reaction gear unit connecting said first and second output shafts, a steering shaft, means for rotating said steering shaft, a first friction clutch effective when engaged to couple said steering shaft through said reaction gear unit to said output shafts so as to relatively accelerate said first output shaft and to relatively retard said second output shaft, and a second friction clutch effective when engaged to couple said steering shaft through said reaction gear unit to said output shafts so as to relatively accelerate said second output shaft and relatively retard said first output shaft, said steering control means comprising a first clutch chamber adapted to contain fluid under pressure, a second clutch chamber adapted to contain fluid under pressure, a first control chamber adapted to contain fluid under pressure, a second control chamber adapted to contain fluid under pressure, means responsive to operation of said first output shaft at a more rapid rate than said second output shaft for supplying fluid to said second control chamber at a rate which varies in accordance with the difference in the speeds of said shafts, means responsive to operation of said second output shaft at a more rapid rate than said first output shaft for supplying fluid to said first control chamber at a rate which varies in accordance with the difference in the speeds of said shafts, a first relay valve subject to the opposing pressures of the fluid in said first control and first clutch chambers, a second relay valve subject to the opposing pressures of the fluid in said second control and second clutch chambers, each of said relay valves being effective to supply fluid under pressure to or to release fluid under pressure from the associated clutch chamber according as the pressure of the fluid in the associated control chamber is more or less than a predetermined amount in excess of the pressure in the associated clutch chamber, a first intercepter valve operative on a predetermined increase in the pressure of the fluid in said first control chamber to establish a communication of restricted flow capacity between said first clutch chamber and said second control chamber, a second intercepter valve operative on a predetermined increase in the pressure of the fluid in said second control chamber to establish a communication of restricted flow capacity between said second clutch chamber and said first control chamber, manually controlled valve means for at times releasing fluid from said first control chamber at adjustably variable rates and for concurrently supplying fluid to said second control chamber and for at other times releasing fluid from said second control chamber at adjustably variable rates and for concurrently supplying fluid to said first control chamber, and means responsive to the opposing pressures of the fluid in said first and second clutch chambers for causing engagement of said first clutch in amounts varying in accordance with the amount by which the pressure of the fluid in said first clutch chamber exceeds the pressure of the fluid in said second clutch chamber and for causing engagement of said second clutch in amounts varying in accordance with the amount by which the pressure of the fluid in said second clutch chamber exceeds the pressure of the fluid in said first clutch chamber.

References Cited in the file of this patent

UNITED STATES PATENTS

| Number | Name | Date |
| --- | --- | --- |
| 2,025,513 | Johnston | Dec. 24, 1935 |
| 2,332,838 | Borgward | Oct. 26, 1943 |
| 2,336,912 | Zimmermann | Dec. 14, 1943 |
| 2,353,554 | Gates | July 11, 1944 |
| 2,389,498 | Gates | Nov. 20, 1945 |
| 2,393,557 | Orshansky | Jan. 22, 1946 |
| 2,444,279 | Bruce et al. | June 29, 1948 |
| 2,533,611 | Norelius | Dec. 12, 1950 |
| 2,560,554 | Colby | July 7, 1951 |